(12) United States Patent
Yamashita et al.

(10) Patent No.: US 11,912,888 B2
(45) Date of Patent: *Feb. 27, 2024

(54) FLUOROPOLYETHER GROUP-CONTAINING COMPOUND

(71) Applicant: DAIKIN INDUSTRIES, LTD., Osaka (JP)

(72) Inventors: Tsuneo Yamashita, Osaka (JP); Hisashi Mitsuhashi, Osaka (JP); Kenichi Katsukawa, Osaka (JP); Takeshi Maehira, Osaka (JP); Yoshimi Motonari, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 124 days.

This patent is subject to a terminal disclaimer.

(21) Appl. No.: 17/448,133

(22) Filed: Sep. 20, 2021

(65) Prior Publication Data

US 2022/0002587 A1  Jan. 6, 2022

Related U.S. Application Data

(63) Continuation of application No. PCT/JP2020/013771, filed on Mar. 26, 2020.

(30) Foreign Application Priority Data

Mar. 29, 2019  (JP) .................. 2019-066333

(51) Int. Cl.
| | | |
|---|---|---|
| C09D 171/02 | (2006.01) | |
| C08G 65/00 | (2006.01) | |
| C08G 65/336 | (2006.01) | |
| C08G 77/46 | (2006.01) | |
| C09D 5/00 | (2006.01) | |
| C09D 183/12 | (2006.01) | |
| C09D 171/00 | (2006.01) | |

(52) U.S. Cl.
CPC ......... C09D 171/02 (2013.01); C08G 65/007 (2013.01); C08G 65/336 (2013.01); C08G 77/46 (2013.01); C09D 5/00 (2013.01); C09D 171/00 (2013.01); C09D 183/12 (2013.01)

(58) Field of Classification Search
CPC ..... C08G 65/007; C08G 65/336; C08L 71/02; C09D 171/02
See application file for complete search history.

(56) References Cited

U.S. PATENT DOCUMENTS

| | | | | |
|---|---|---|---|---|
| 4,094,911 A | * | 6/1978 | Mitsch | C08G 18/773 528/229 |
| 6,200,684 B1 | | 3/2001 | Yamaguchi et al. | |
| 2013/0136928 A1 | * | 5/2013 | Yamane | C09D 183/12 428/421 |
| 2019/0218339 A1 | | 7/2019 | Hoshino et al. | |

FOREIGN PATENT DOCUMENTS

| | | | |
|---|---|---|---|
| CN | 106565944 A | * | 4/2017 |
| CN | 107501541 A | * | 12/2017 |
| JP | 2000-327772 A | | 11/2000 |
| KR | 10-2015-0054147 A | | 5/2015 |
| WO | 2009/008380 A1 | | 1/2009 |
| WO | 2018/043166 A1 | | 3/2018 |

OTHER PUBLICATIONS

International Preliminary Report on Patentability dated Sep. 28, 2021 with translation of the Written Opinion in International Application No. PCT/JP2020/013771.
International Search Report for PCT/JP2020/013771 dated Jun. 16, 2020 (PCT/ISA/210).
Extended European Search Report dated Oct. 26, 2022 in European Application No. 20784875.5.

* cited by examiner

Primary Examiner — Marc S Zimmer
(74) Attorney, Agent, or Firm — Sughrue Mion, PLLC

(57) ABSTRACT

A fluoropolyether group-containing compound represented by formula (1) or (2) below:

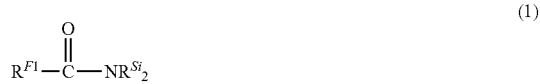

(1)

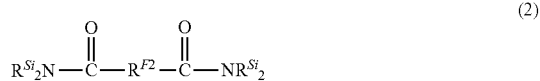

(2)

wherein $R^{Si}$ is represented by formula (Si), and the symbols are as defined in the description $$-X^1-SiR^{a1}_{p1}R^{b1}_{q1}R^{c1}_{r1} \quad (S1).$$

7 Claims, No Drawings

FLUOROPOLYETHER GROUP-CONTAINING COMPOUND

CROSS REFERENCE TO RELATED APPLICATIONS

This application is a Rule 53(b) Continuation of International Application No. PCT/JP2020/013771 filed Mar. 26, 2020, claiming priority based on Japanese Patent Application No. 2019-066333 filed Mar. 29, 2019, the respective disclosures of which are incorporated herein by reference in their entirety.

TECHNICAL FIELD

The present disclosure relates to a fluoropolyether group-containing compound.

BACKGROUND ART

A certain types of a fluorine-containing silane compound is known to be capable of providing excellent water-repellency, oil-repellency, antifouling property, and the like when used in surface treatment of a substrate. A layer obtained from a surface-treating agent containing the fluorine-containing silane compound (hereinafter, also referred to as a "surface-treating layer") is applied as a so-called functional thin film to a large variety of substrates such as glass, plastics, fibers, and building materials.

A known such fluorine-containing compound is a fluoropolyether group-containing silane compound having a fluoropolyether group in the molecular backbone and a hydrolyzable group bonded to a Si atom at the molecular terminal or in the terminal part (Patent Literature 1).

PRIOR ART LITERATURE

Patent Literature

Patent Literature 1: JP 2000-327772 A

SUMMARY

Solution to Problem

The present disclosure provides [1] below.

[1] A fluoropolyether group-containing compound represented by formula (1) or (2) below:

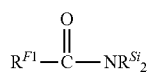

(1)

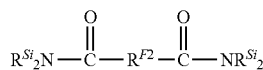

(2)

wherein
$R^{F1}$ is $R^{f1}$—$R^F$—$O_q$—;
$R^{F2}$ is —$R^{f2}_p$—$R^F$—$O_q$—;
$R^{f1}$ is a $C_{1-16}$ alkyl group optionally substituted with one or more fluorine atoms;
$R^{f2}$ is a $C_{1-6}$ alkylene group optionally substituted with one or more fluorine atoms;
$R^F$ is each independently at each occurrence a group represented by formula:

$a$, $b$, $c$, and $d$ are each independently an integer of 0 or more and 30 or less, $e$ and $f$ are each independently an integer of 1 or more and 200 or less, the sum of $a$, $b$, $c$, $d$, $e$, and $f$ is at least 5, the occurrence order of each repeating unit enclosed in parentheses provided with a subscript $a$, $b$, $c$, $d$, $e$, or $f$ is not limited in the formula, and the ratio of $e$ to $f$ is less than 0.9;
$R^{Fa}$ is each independently at each occurrence a hydrogen atom, a fluorine atom, or a chlorine atom;
$p$ is 0 or 1;
$q$ is independently 0 or 1;
$R^{Si}$ is each independently at each occurrence represented by formula (S1) below:

$$—X^1—SiR^{a1}{}_{p1}R^{b1}{}_{q1}R^{c1}{}_{r1} \quad (S1)$$

$X^1$ is each independently at each occurrence a single bond, an oxygen atom, or a divalent organic group;
$R^{a1}$ is each independently at each occurrence —$Z^{1'}$— $SiR^{a1'}{}_{p1'}R^{b1'}{}_{q1'}R^{d1'}{}_{r1'}$;
$Z^{1'}$ is each independently at each occurrence a single bond, an oxygen atom, or a divalent organic group;
$R^{a1'}$ is each independently at each occurrence —$Z^{1''}$— $SiR^{a1''}{}_{p1''}R^{b1''}{}_{q1''}R^{c1''}{}_{r1''}$;
$Z^{1''}$ is each independently at each occurrence a single bond, an oxygen atom, or a divalent organic group;
$R^{a1''}$ is each independently at each occurrence —$Z^{1'''}$— $SiR^{b1'''}{}_{q1'''}R^{c1'''}{}_{r1'''}$;
$Z^{1'''}$ is each independently at each occurrence a single bond, an oxygen atom, or a divalent organic group;
$R^{b41'''}$ is each independently at each occurrence a hydroxyl group or a hydrolyzable group;
$R^{c1'''}$ is each independently at each occurrence a hydrogen atom or a monovalent organic group;
$q1'''$ is each independently at each occurrence an integer of 0 to 3;
$r1'''$ is each independently at each occurrence an integer of 0 to 3;
$R^{b1''}$ is each independently at each occurrence a hydroxyl group or a hydrolyzable group;
$R^{c1''}$ is each independently at each occurrence a hydrogen atom or a monovalent organic group;
$p1''$ is each independently at each occurrence an integer of 0 to 3;
$q1''$ is each independently at each occurrence an integer of 0 to 3;
$r1''$ is each independently at each occurrence an integer of 0 to 3;
$R^{b1'}$ is each independently at each occurrence a hydroxyl group or a hydrolyzable group;
$R^{c1'}$ is each independently at each occurrence a hydrogen atom or a monovalent organic group;
$p1'$ is each independently at each occurrence an integer of 0 to 3;
$q1'$ is each independently at each occurrence an integer of 0 to 3;
$r1'$ is each independently at each occurrence an integer of 0 to 3;
$R^{b1}$ is each independently at each occurrence a hydroxyl group or a hydrolyzable group;
$R^{c1}$ is each independently at each occurrence a hydrogen atom or a monovalent organic group;
$p1$ is each independently at each occurrence an integer of 0 to 3;
$q1$ is each independently at each occurrence an integer of 0 to 3; and r1 is each independently at each occurrence an integer of 0 to 3;

provided that at least one $R^{b1}$, $R^{b1'}$, $R^{b1''}$, or $R^{b1'''}$ is present for each group represented by $R^{Si}$.

Advantageous Effect

According to the present disclosure, it is possible to form a fluoroalkyl group-containing compound suitable for forming a cured layer having good friction durability.

DESCRIPTION OF EMBODIMENTS

The "monovalent organic group" as used herein means a carbon-containing monovalent group. The monovalent organic group is not limited, and may be a hydrocarbon group or a derivative thereof. The derivative of the hydrocarbon group means a group having one or more of N, O, S, Si, amide, sulfonyl, siloxane, carbonyl, carbonyloxy, and the like at the terminal or in the molecular chain of the hydrocarbon group.

The "divalent organic group" as used herein is not limited, and examples include a divalent group obtained by removing one more hydrogen atom from the hydrocarbon group.

The "hydrocarbon group" as used herein means a group that contains carbon and hydrogen and that is obtained by removing one hydrogen atom from the molecule. The hydrocarbon group is not limited, and examples include a hydrocarbon group that has 1 to 20 carbon atoms and that is optionally substituted with one or more substituents, such as an aliphatic hydrocarbon group and an aromatic hydrocarbon group. The "aliphatic hydrocarbon group" may be either straight, branched, or cyclic, and may be either saturated or unsaturated. The hydrocarbon group may contain one or more ring structures. The hydrocarbon group may have one or more of N, O, S, Si, amide, sulfonyl, siloxane, carbonyl, carbonyloxy, and the like at the terminal or in the molecular chain thereof.

The substituent of the "hydrocarbon group" as used herein is not limited, and examples include one or more groups selected from a halogen atom, and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{6-10}$ aryl group, and a 5 to 10-membered heteroaryl group each optionally substituted with one or more halogen atoms.

Herein, the alkyl group and the phenyl group may be substituted or unsubstituted, unless specified otherwise. A substituent of such a group is not limited, and examples include one or more groups selected from a halogen atom, a $C_{1-6}$ alkyl group, a $C_{2-6}$ alkenyl group, and a $C_{2-6}$ alkynyl group.

The term "hydrolyzable group" as used herein means a group capable of undergoing a hydrolysis reaction, i.e., means a group that can be removed from the main backbone of a compound by a hydrolysis reaction. Examples of the hydrolyzable group include —$OR^h$, —$OCOR^h$, —O—N=$CR^h{}_2$, —$NR^h{}_2$, —$NHR^h$, and halogen (in these formulae, $R^h$ represents a substituted or unsubstituted $C_{1-4}$ alkyl group).

The fluoropolyether group-containing compound of the present disclosure is a compound represented by formula (1) or (2) below:

(1)

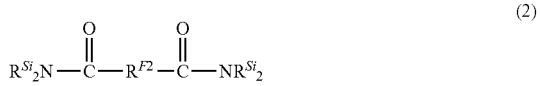

(2)

In formula (1), $R^{F1}$ is each independently at each occurrence $R^{f1}$—$R^F$—$O_q$—.

In formula (2), $R^{F2}$ is —$R^{f2}{}_p$—$R^F$—$O_q$—.

In the formulae, $R^{f1}$ is each independently at each occurrence a $C_{1-16}$ alkyl group optionally substituted with one or more fluorine atoms.

The "$C_{1-16}$ alkyl group" optionally substituted with one or more fluorine atoms may be straight or branched, and is preferably a straight or branched $C_{1-6}$ alkyl group and in particular $C_{1-3}$ alkyl group, and more preferably a straight $C_{1-6}$ alkyl group and in particular a straight $C_{1-3}$ alkyl group.

$R^{f1}$ is preferably a $C_{1-16}$ alkyl group substituted with one or more fluorine atoms, more preferably a $CF_2H$—$C_{1-15}$ perfluoroalkylene group, and even more preferably a $C_{1-16}$ perfluoroalkyl group.

The $C_{1-16}$ perfluoroalkyl group may be straight or branched, and is preferably a straight or branched $C_{1-6}$ perfluoroalkyl group and in particular $C_{1-3}$ perfluoroalkyl group, more preferably a straight $C_{1-6}$ perfluoroalkyl group and in particular a straight $C_{1-3}$ perfluoroalkyl group, and specifically —$CF_3$, —$CF_2CF_3$, or —$CF_2CF_2CF_3$.

In the formulae, $R^{f2}$ is a $C_{1-6}$ alkylene group optionally substituted with one or more fluorine atoms.

The "$C_{1-6}$ alkylene group" as in the $C_{1-6}$ alkylene group optionally substituted with one or more fluorine atoms may be straight or branched, and is preferably a straight or branched $C_{1-3}$ alkylene group, and more preferably a straight $C_{1-3}$ alkylene group.

$R^{f2}$ is preferably a $C_{1-6}$ alkylene group substituted with one or more fluorine atoms, more preferably a $C_{1-6}$ perfluoroalkylene group, and even more preferably a $C_{1-3}$ perfluoroalkylene group.

The $C_{1-6}$ perfluoroalkylene group may be straight or branched, and is preferably a straight or branched $C_{1-3}$ perfluoroalkylene group, more preferably a straight $C_{1-3}$ perfluoroalkyl group, and specifically —$CF_2$—, —$CF_2CF_2$—, or —$CF_2CF_2CF_2$—.

In the formulae, p is 0 or 1. In one embodiment, p is 0. In another embodiment, p is 1.

In the formulae, q is each independently at each occurrence 0 or 1. In one embodiment, q is 0. In another embodiment, q is 1.

In formulae (1) and (2), $R^F$ is each independently at each occurrence a fluoropolyether group represented by the following formula. As for the structure referred to as $R^F$, the left side is bonded to a structure represented by $R^{f1}$ in formula (1), and the left side is bonded to a structure represented by $R^{f2}{}_p$ in formula (2).

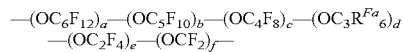

wherein $R^{Fa}$ is each independently at each occurrence a hydrogen atom, a fluorine atom, or a chlorine atom;

a, b, c, and d are each independently an integer of 0 or more and 30 or less;

e and f are each independently an integer of 1 or more and 200 or less;

the sum of a, b, c, d, e, and f is at least 5;
the occurrence order of each repeating unit in parentheses provided with a subscript a, b, c, d, e, or f is not limited in the formula; and
the ratio of e to f (hereinafter, sometimes referred to as an "e/f ratio") is less than 0.9.

$R^{Fa}$ is preferably each independently at each occurrence a hydrogen atom or a fluorine atom, and more preferably a fluorine atom.

These repeating units may be straight or branched, and are preferably straight. For example, —$(OC_6F_{12})$— may be —$(OCF_2CF_2CF_2CF_2CF_2CF_2)$—, —$(OCF(CF_3)CF_2CF_2CF_2CF_2)$—, —$(OCF_2CF(CF_3)CF_2CF_2CF_2)$—, —$(OCF_2CF_2CF(CF_3)CF_2CF_2)$—, —$(OCF_2CF_2CF_2CF(CF_3)CF_2)$—, —$(OCF_2CF_2CF_2CF_2CF(CF_3))$—, or the like, and is preferably —$(OCF_2CF_2CF_2CF_2CF_2CF_2)$—. —$(OC_5F_{10})$— may be —$(OCF_2CF_2CF_2CF_2CF_2)$—, —$(OCF(CF_3)CF_2CF_2CF_2)$—, —$(OCF_2CF(CF_3)CF_2CF_2)$—, —$(OCF_2CF_2CF(CF_3)CF_2)$—, —$(OCF_2CF_2CF_2CF(CF_3))$—, or the like, and is preferably —$(OCF_2CF_2CF_2CF_2CF_2)$—, —$(OC_4F_8)$— may be any of —$(OCF_2CF_2CF_2CF_2)$—, —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5)CF_2)$—, and —$(OCF_2CF(C_2F_5))$—, and is preferably —$(OCF_2CF_2CF_2CF_2)$—. —$(OC_3F_6)$— (that is to say, in the formula, $R^{Fa}$ is a fluorine atom) may be any of —$(OCF_2CF_2CF_2)$—, —$(OCF(CF_3)CF_2)$—, and —$(OCF_2CF(CF_3))$—, and is preferably —$(OCF_2CF_2CF_2)$—. Also, —$(OC_2F_4)$— may be any of —$(OCF_2CF_2)$— and —$(OCF(CF_3))$—, and is preferably —$(OCF_2CF_2)$—.

The a and b may be 0.

In one embodiment, a, b, c, and d are each independently preferably an integer of 20 or less, more preferably an integer of 10 or less, and particularly preferably an integer of 5 or less, and may be 0.

In one embodiment, the sum of a, b, c, and d is preferably 30 or less, more preferably 20 or less, even more preferably 10 or less, and particularly preferably 5 or less.

In one embodiment, in $R^F$, the ratio of the sum of e and f to the sum of a, b, c, d, e, and f is preferably 0.80 or more, more preferably 0.90 or more, even more preferably 0.98 or more, and particularly preferably 0.99 or more.

In a preferable embodiment, $R^F$ is —$(OC_4F_8)_c$—$(OC_3F_6)_d$—$(OC_2F_4)_e$—$(OCF_2)_f$— wherein c and d are each independently an integer of 0 or more and 30 or less; e and f are each independently an integer of 1 or more and 200 or less, preferably 5 or more and 200 or less, and more preferably 10 or more and 200 or less; and the occurrence order of each repeating unit enclosed in parentheses provided with a subscript c, d, e, or f is not limited in the formula. Preferably, $R^F$ is —$(OCF_2CF_2CF_2CF_2)_c$—$(OCF_2CF_2CF_2)_d$—$(OCF_2CF_2)_e$—$(OCF_2)_f$—. In one embodiment, $R^F$ may be —$(OC_2F_4)_e$—$(OCF_2)_f$— wherein e and f are each independently an integer of 1 or more and 200 or less, preferably 5 or more and 200 or less, and more preferably 10 or more and 200 or less, and the occurrence order of each repeating unit in parentheses provided with a subscript e or f is not limited in the formula.

More preferably, $R^F$ is —$(OC_2F_4)_e$—$(OCF_2)_f$— wherein e and f are each independently an integer of 1 or more and 200 or less, preferably 5 or more and 200 or less, and more preferably 10 or more and 200 or less, and the occurrence order of each repeating unit enclosed in parentheses provided with a subscript e or f is not limited in the formula.

In one embodiment, e may be an integer of 10 or more and 100 or less, and f may be an integer of 11 or more and 100 or less; or e may be an integer of 15 or more and 70 or less, and f may be an integer of 21 or more and 95 or less.

In one embodiment, the sum of e and f is preferably 20 or more, more preferably 30 or more, and particularly preferably 40 or more.

In another embodiment, the sum of e and f is preferably 100 or more, more preferably 120 or more, even more preferably 130 or more, and particularly preferably 140 or more.

In one embodiment, the sum of e and f is preferably 200 or less, more preferably 180 or less, even more preferably 160 or less, and particularly preferably 150 or less.

In $R^F$, the e/f ratio may be less than 0.9 such as 0.8 or less or 0.7 or less. The e/f ratio is preferably 0.2 or more, more preferably 0.3 or more, even more preferably 0.4 or more, and particularly preferably 0.5 or more. The e/f ratio may be, for example, 0.2 or more and less than 0.9, specifically 0.4 or more and 0.8 or less, and more specifically 0.5 or more and 0.7 or less.

When the e/f ratio is too low, the hydrolyzability of a cured layer (such as a surface-treating layer) formed using the compound of the present disclosure may be increased, and the durability of the cured layer may be impaired. When the e/f ratio is too high, the dynamic friction coefficient of a cured layer formed using the compound of the present disclosure may be increased, and a cured layer having sufficient friction durability may not be obtained. Due to such an e/f ratio, a cured layer formed using the compound of the present disclosure has good friction durability, and thus the surface of the cured layer has good lubricity. Also, it is considered that, due to the e/f ratio being in the above range, a secondary structure of the $R^F$ moiety likely has a spiral structure. It is considered that, as a result, the polymer density per unit area or the crosslink density of the silane coupling agent is increased (the density becomes higher than those when the e/f ratio is large), and thus the strength of the cured layer is increased.

Herein, due to the use of a compound having such $R^F$, a cured layer (or a cured film) formed using the compound has good durability (chemical resistance), friction durability, water-repellency, oil-repellency, antifouling properties (e.g., preventing grimes such as fingerprints from adhering), waterproof properties (preventing water from entering electronic components and the like), surface slickness (or lubricity, e.g., removability of grimes such as fingerprints by wiping, and excellent tactile sensation), or the like. This is considered to be because, due to the use of the compound having such $R^F$, the dynamic friction coefficient of the surface of the cured layer formed of the compound is reduced.

The number average molecular weights of $R^{F1}$ and $R^{F2}$ moieties are not limited, and are each independently, for example, 500 to 30,000, preferably 1,500 to 30,000, and more preferably 2,000 to 10,000. Herein, the number average molecular weights of $R^{F1}$ and $R^{F2}$ are values measured by $^{19}$F-NMR measurement.

In another embodiment, the number average molecular weights of $R^{F1}$ and $R^{F2}$ moieties may be 500 to 30,000, preferably 1,000 to 20,000, more preferably 2,000 to 15,000, and even more preferably 2,000 to 10,000, such as 3,000 to 8,000. In another embodiment, the number average molecular weights of $R^{F1}$ and $R^{F2}$ moieties may be 2,000 to 8,000.

In another embodiment, the number average molecular weights of $R^{F1}$ and $R^{F2}$ moieties may be 3,000 to 30,000, preferably 3,000 to 15,000, and more preferably 3,500 to 15,000.

In another embodiment, the number average molecular weights of $R^{F1}$ and $R^{F2}$ moieties may be 5,000 to 30,000, preferably 8,000 to 15,000, and more preferably 10,000 to 15,000.

In one embodiment, in the fluoropolyether group-containing compound of the present disclosure, $R^{F1}$ and $R^{F2}$ moieties have a number average molecular weight in a range of 2,000 to 15,000 and an e/f ratio of 0.4 or more and less than 0.9; in another embodiment, $R^{F1}$ and $R^{F2}$ moieties have a number average molecular weight in a range of 3,500 to 15,000 and an e/f ratio in a range of 0.4 or more and less than 0.9; and in yet another embodiment, $R^{F1}$ and $R^{F2}$ moieties have a number average molecular weight in a range of 3,500 to 15,000 and an e/f ratio in a range of 0.5 or more and 0.7 or less. Such a fluoropolyether group-containing compound can contribute to the formation of a cured layer having an extremely low dynamic friction coefficient and exhibiting good lubrication properties.

In another embodiment, $R^{F1}$ and $R^{F2}$ moieties have a number average molecular weight in a range of 5,000 to 30,000 and an e/f ratio in a range of 0.5 or more and 0.7 or less, preferably a number average molecular weight in a range of 8,000 to 15,000 and an e/f ratio of 0.5 or more and 0.7 or less, and more preferably a number average molecular weight in a range of 10,000 to 15,000 and an e/f ratio of 0.5 or more and 0.7 or less.

Herein, in the fluoropolyether group-containing compounds represented by formulae (1) and (2), the group represented by $R^{F1}$ or $R^{F2}$ and the group represented by $R^{Si}$ are bonded via C(=O)—N. Here, in the compounds represented by formulae (1) and (2), the group represented by $R^{F1}$ or $R^{F2}$ is a group containing a fluoropolyether group that mainly provides water-repellency, surface slickness, and the like, and the group represented by $R^{Si}$ is a silane moiety that provides the ability to bind to a substrate. As described above, due to the structure represented by C(=O)—N, a cured layer formed using the fluoropolyether group-containing compounds represented by formulae (1) and (2) may have good chemical resistance (e.g., resistance to an aqueous solution of strong alkali and an aqueous solution of strong acid, and resistance to oxidation by active oxygen species).

Moreover, in the fluoropolyether group-containing compounds represented by formulae (1) and (2) of the present disclosure, the group represented by $R^F$ of $R^{F1}$ or $R^{F2}$ has an e/f ratio in a specific range. Due to such a structure, a cured layer formed using the fluoropolyether group-containing compounds represented by formula (1) and/or (2) can exhibit extremely high chemical resistance, friction durability, water-repellency, oil-repellency, antifouling properties (e.g., preventing grimes such as fingerprints from adhering), waterproof properties (preventing water from entering electronic components and the like), and surface slickness (or lubricity, e.g., removability of grimes such as fingerprints by wiping, and excellent tactile sensation).

In formulae (1) and (2), $R^{Si}$ is each independently at each occurrence a monovalent group containing a Si atom to which a hydroxyl group, a hydrolyzable group, a hydrogen atom, or a monovalent organic group is bonded.

In the fluoropolyether group-containing compounds represented by formulae (1) and (2), two groups represented by $R^{Si}$ are bonded to the N atom of C(=O)—N. Due to such a structure, a cured layer formed using the compound of the present disclosure can have good bonding strength to a substrate and, as a result, can have good chemical resistance (such as durability against a solvent, durability against artificial sweat, resistance to an aqueous solution of strong alkali and an aqueous solution of strong acid, and resistance to oxidation by active oxygen species), friction durability, weather resistance, durability against ultraviolet exposure, and the like.

$R^{Si}$ is each independently at each occurrence represented by formula (S1) below.

  (S1)

In formula (S1), $X^1$ is each independently at each occurrence a single bond, an oxygen atom, or a divalent organic group.

In one embodiment, $X^1$ is a single bond.
In one embodiment, $X^1$ is an oxygen atom.
$X^1$ is preferably a divalent organic group.
Examples of $X^1$ that is a divalent organic group include, but are not limited to, groups represented by:

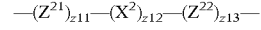

wherein $Z^{21}$ and $Z^{22}$ are a divalent organic group;
$X^2$ is an oxygen atom;
z11 is 0 or 1; z12 is 0 or 1; and z13 is 0 or 1, provided that at least one of z11 and z13 is 1.

$X^1$ is preferably a $C_{1-6}$ alkylene group, —$(CH_2)_{z5}$—O—$(CH_2)_{z6}$— (wherein z5 is an integer of 0 to 6, such as an integer of 1 to 6; z6 is an integer of 0 to 6, such as an integer of 1 to 6; and the sum of z5 and z6 is 1 or more), or —$(CH_2)_{z7}$-phenylene-$(CH_2)_{z8}$— (wherein z7 is an integer of 0 to 6, such as an integer of 1 to 6; z8 is an integer of 0 to 6, such as an integer of 1 to 6; and preferably the sum of z7 and z8 is 1 or more). The $C_{1-6}$ alkylene group may be straight or branched, and is preferably straight. These groups may be substituted with one or more substituents selected from, for example, a fluorine atom, a $C_{1-6}$ alkyl group, a $C_{2-6}$ alkenyl group, and a $C_{2-6}$ alkynyl group, and are preferably unsubstituted.

In a preferable embodiment, $X^1$ is a $C_{1-6}$ alkylene group or —$(CH_2)_{z7}$-phenylene-$(CH_2)_{z8}$—, and preferably -phenylene-$(CH_2)_{z8}$—. When X' is such a group, the light resistance or in particular the ultraviolet resistance of a cured layer formed may be more increased. Preferably, z7 is an integer of 0 to 6, and z8 is an integer of 1 to 6.

In another preferable embodiment, $X^1$ is a $C_{1-6}$ alkylene group, and more preferably a $C_{1-3}$ alkylene group. Due to such a structure, the light resistance or in particular the ultraviolet resistance of a cured layer formed can be more increased.

In one embodiment, $X^1$ may be —$CH_2CH_2CH_2$—.
$R^{a1}$ is each independently at each occurrence —$Z^{1'}$—$SiR^{a1'}_{p1}R^{b1'}_{q1}R^{c1'}_{r1'}$.

$Z^{1'}$ is each independently at each occurrence a single bond, an oxygen atom, or a divalent organic group.

In one embodiment, $Z^{1'}$ is a single bond.
In one embodiment, $Z^{1'}$ is an oxygen atom.
$Z^{1'}$ is preferably a divalent organic group.
In a preferable embodiment, $Z^{1'}$ does not form a siloxane bond with a Si atom to which $Z^{1'}$ is bonded. That is to say, in formula (S1), (Si—$Z^{1'}$—Si) does not contain a siloxane bond.

Examples of $Z^{1'}$ that is a divalent organic group include, but are not limited to, groups represented by:

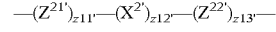

wherein $Z^{21'}$ and $Z^{22'}$ are a divalent organic group;
$X^{2'}$ is an oxygen atom;

z11' is 0 or 1; z12' is 0 or 1; and z13' is 0 or 1, provided that at least one of z11' and z13' is 1.

$Z^{1'}$ is preferably a $C_{1-6}$ alkylene group, —$(CH_2)_{z5'}$—O—$(CH_2)_{z6'}$— (wherein z5' is an integer of 0 to 6, such as an integer of 1 to 6; z6' is an integer of 0 to 6, such as an integer of 1 to 6; and the sum of z5' and z6' is 1 or more), or —$(CH_2)_{z7'}$-phenylene-$(CH_2)_{z8'}$— (wherein z7' is an integer of 0 to 6, such as an integer of 1 to 6; z8' is an integer of 0 to 6, such as an integer of 1 to 6; and preferably the sum of z7' and z8' is 1 or more). The $C_{1-6}$ alkylene group may be straight or branched, and is preferably straight. These groups may be substituted with one or more substituents selected from, for example, a fluorine atom, a $C_{1-6}$ alkyl group, a $C_{2-6}$ alkenyl group, and a $C_{2-6}$ alkynyl group, and are preferably unsubstituted.

In a preferable embodiment, $Z^{1'}$ is a $C_{1-6}$ alkylene group or —$(CH_2)_{z7'}$-phenylene-$(CH_2)_{z8'}$—, and preferably -phenylene-$(CH_2)_{z8'}$—. When $Z^{1'}$ is such a group, the light resistance or in particular the ultraviolet resistance of a cured layer formed may be more increased. Preferably, z7' is an integer of 0 to 6, and z8' is an integer of 1 to 6.

In another preferable embodiment, $Z^{1'}$ is a $C_{1-6}$ alkylene group, and more preferably a $C_{1-3}$ alkylene group. Due to such a structure, the light resistance or in particular the ultraviolet resistance of a cured layer formed may be more increased.

In one embodiment, $Z^{1'}$ may be —$CH_2CH_2CH_2$—. In another embodiment, $Z^{1'}$ may be —$CH_2CH_2$—.

$R^{a1'}$ is each independently at each occurrence —$Z^{1''}$—$SiR^{a1''}_{p1''}R^{b1''}_{q1''}R^{c1''}_{r1''}$.

$Z^{1''}$ is each independently at each occurrence a single bond, an oxygen atom, or a divalent organic group.

In one embodiment, $Z^{1''}$ is a single bond.

In one embodiment, $Z^{1''}$ is an oxygen atom.

$Z^{1''}$ is preferably a divalent organic group.

In a preferable embodiment, $Z^{1''}$ does not form a siloxane bond with a Si atom to which $Z^{1''}$ is bonded. That is to say, in formula (S1), (Si—$Z^{1''}$—Si) does not contain a siloxane bond.

Examples of $Z^{1''}$ that is a divalent organic group include, but are not limited to, groups represented by:

—$(Z^{21''})_{z11''}$—$(X^{2''})_{z12''}$—$(Z^{22''})_{z13''}$— wherein $Z^{21''}$ and $Z^{22''}$ are a divalent organic group;
$X^{2''}$ is an oxygen atom;
z11'' is 0 or 1; z12'' is 0 or 1; and z13'' is 0 or 1, provided that at least one of z11'' and z13'' is 1.

$Z^{1''}$ is preferably a $C_{1-6}$ alkylene group, —$(CH_2)_{z5''}$—O—$(CH_2)_{z6''}$— (wherein z5'' is an integer of 0 to 6, such as an integer of 1 to 6; z6'' is an integer of 0 to 6, such as an integer of 1 to 6; and the sum of z5'' and z6'' is 1 or more), or —$(CH_2)_{z7''}$-phenylene-$(CH_2)_{z8''}$— (wherein z7'' is an integer of 0 to 6, such as an integer of 1 to 6; z8'' is an integer of 0 to 6, such as an integer of 1 to 6; and preferably the sum of z7'' and z8'' is 1 or more). The $C_{1-6}$ alkylene group may be straight or branched, and is preferably straight. These groups may be substituted with one or more substituents selected from, for example, a fluorine atom, a $C_{1-6}$ alkyl group, a $C_{2-6}$ alkenyl group, and a $C_{2-6}$ alkynyl group, and are preferably unsubstituted.

In a preferable embodiment, $Z^{1''}$ is a $C_{1-6}$ alkylene group or —$(CH_2)_{z7''}$-phenylene-$(CH_2)_{z8''}$—, and preferably -phenylene-$(CH_2)_{z8''}$—. When $Z^{1''}$ is such a group, the light resistance or in particular the ultraviolet resistance of a cured layer formed may be more increased. Preferably, z7'' is an integer of 0 to 6, and z8'' is an integer of 1 to 6.

In another preferable embodiment, $Z^{1''}$ is a $C_{1-6}$ alkylene group, and more preferably a $C_{1-3}$ alkylene group. Due to such a structure, the light resistance or in particular the ultraviolet resistance of a cured layer formed may be more increased.

In one embodiment, $Z^{1''}$ may be —$CH_2CH_2CH_2$—. In another embodiment, $Z^{1''}$ may be —$CH_2CH_2$—.

$R^{a1''}$ is each independently at each occurrence —$Z^{1'''}$—$SiR^{b1'''}_{q1'''}R^{c1'''}_{r1'''}$.

$Z^{1'''}$ is each independently at each occurrence a single bond, an oxygen atom, or a divalent organic group.

In one embodiment, $Z^{1'''}$ is a single bond.

In one embodiment, $Z^{1'''}$ is an oxygen atom.

$Z^{1'''}$ is preferably a divalent organic group.

In a preferable embodiment, $Z^{1'''}$ does not form a siloxane bond with a Si atom to which $Z^{1'''}$ is bonded. That is to say, in formula (S1), (Si—$Z^{1'''}$—Si) does not contain a siloxane bond.

Examples of the divalent organic group $Z^{1'''}$ include, but are not limited to, groups represented by:

—$(Z^{21'''})_{z11'''}$—$(X^{2'''})_{z12'''}$—$(Z^{22'''})_{z13'''}$— wherein $Z^{21'''}$ and $Z^{22'''}$ are each a divalent organic group;
$X^{2'''}$ is an oxygen atom;
z11''' is 0 or 1; z12''' is 0 or 1; and z13''' is 0 or 1, provided that at least one of z11''' and z13''' is 1.

$Z^{1'''}$ is preferably a $C_{1-6}$ alkylene group, —$(CH_2)_{z5'''}$—O—$(CH_2)_{z6'''}$— (wherein z5''' is an integer of 0 to 6, such as an integer of 1 to 6; z6''' is an integer of 0 to 6, such as an integer of 1 to 6; and the sum of z5''' and z6''' is 1 or more), or —$(CH_2)_{z7'''}$-phenylene-$(CH_2)_{z8'''}$— (wherein z7''' is an integer of 0 to 6, such as an integer of 1 to 6; z8''' is an integer of 0 to 6, such as an integer of 1 to 6; and preferably the sum of z7''' and z8''' is 1 or more). The $C_{1-6}$ alkylene group may be straight or branched, and is preferably straight. These groups may be substituted with one or more substituents selected from, for example, a fluorine atom, a $C_{1-6}$ alkyl group, a $C_{2-6}$ alkenyl group, and a $C_{2-6}$ alkynyl group, and are preferably unsubstituted.

In a preferable embodiment, $Z^{1'''}$ is a $C_{1-6}$ alkylene group or —$(CH_2)_{z7'''}$-phenylene-$(CH_2)_{z8'''}$—, and preferably -phenylene-$(CH_2)_{z8'''}$—. When $Z^{1'''}$ is such a group, the light resistance or in particular the ultraviolet resistance of a cured layer formed may be more increased. Preferably, z7''' is an integer of 0 to 6, and z8''' is an integer of 1 to 6.

In another preferable embodiment, $Z^{1'''}$ is a $C_{1-6}$ alkylene group, and more preferably a $C_{1-3}$ alkylene group. Due to such a structure, the light resistance or in particular the ultraviolet resistance of a cured layer formed may be more increased.

In one embodiment, $Z^{1'''}$ may be —$CH_2CH_2CH_2$—. In another embodiment, $Z^{1'''}$ may be —$CH_2CH_2$—.

$R^{b1'''}$ is each independently at each occurrence a hydroxyl group or a hydrolyzable group. $R^{b1'''}$ is preferably each independently at each occurrence a hydrolyzable group.

$R^{b1'''}$ is preferably each independently at each occurrence —$OR^h$, —$OCOR^h$, —O—N=$CR^h_2$, —$NR^h_2$, —$NHR^h$, or halogen (in these formulae, $R^h$ represents a substituted or unsubstituted $C_1$-4 alkyl group), and more preferably —$OR^h$ (i.e., an alkoxy group). Examples of $R^h$ include unsubstituted alkyl groups such as a methyl group, an ethyl group, a propyl group, an isopropyl group, a n-butyl group, and an isobutyl group; and substituted alkyl groups such as a chloromethyl group. Among such groups, an alkyl group or in particular an unsubstituted alkyl group is preferable, and a methyl group or an ethyl group is more preferable. In one embodiment, $R^h$ is a methyl group, and in another embodiment, $R^h$ is an ethyl group.

$R^{c1'''}$ is each independently at each occurrence a hydrogen atom or a monovalent organic group. Such a monovalent organic group does not include a group which forms the hydrolyzable group as mentioned above.

In $R^{c1'''}$, the monovalent organic group is preferably a $C_{1-20}$ alkyl group, more preferably a $C_{1-6}$ alkyl group, and even more preferably a methyl group.

$q1'''$ is each independently at each occurrence an integer of 0 to 3, and $r1'''$ is each independently at each occurrence 0 to 3. The sum of $q1'''$ and $r1'''$ is 3 in the $(SiR^{b1'''}{}_{q1'''}R^{c1'''}{}_{r1'''})$ unit.

Preferably $q1'''$ is an integer of 1 to 3, $r1'''$ is an integer of 0 to 2, more preferably $q1'''$ is 2 or 3, and $r1'''$ is 0 or 1, and particularly preferably $q1'''$ is 3.

$R^{b1''}$ is each independently at each occurrence a hydroxyl group or a hydrolyzable group. $R^{b1''}$ is preferably each independently at each occurrence a hydrolyzable group.

$R^{b1''}$ is preferably each independently at each occurrence $-OR^h$, $-OCOR^h$, $-O-N=CR^h{}_2$, $-NR^h{}_2$, $-NHR^h$, or halogen (in these formulae, $R^h$ represents a substituted or unsubstituted $C_{1-4}$ alkyl group), and more preferably $-OR^h$ (i.e., an alkoxy group). Examples of $R^h$ include unsubstituted alkyl groups such as a methyl group, an ethyl group, a propyl group, an isopropyl group, a n-butyl group, and an isobutyl group; and substituted alkyl groups such as a chloromethyl group. Among such groups, an alkyl group or in particular an unsubstituted alkyl group is preferable, and a methyl group or an ethyl group is more preferable. In one embodiment, $R^h$ is a methyl group, and in another embodiment, $R^h$ is an ethyl group.

$R^{c1''}$ is each independently at each occurrence a hydrogen atom or a monovalent organic group. Such a monovalent organic group does not include a group which forms the hydrolyzable group as mentioned above.

In $R_{c1''}$, the monovalent organic group is preferably a $C_{1-20}$ alkyl group, more preferably a $C_{1-6}$ alkyl group, and even more preferably a methyl group.

$p1''$ is each independently at each occurrence an integer 0 to 3, $q1''$ is each independently at each occurrence an integer of 0 to 3, and $r1''$ is each independently at each occurrence an integer of 0 to 3. The sum of $p1''$, $q1''$, and $r1''$ is 3 in the $(SiR^{a1''}{}_{p1''}R^{b1''}{}_{q1''}R^{c1''}{}_{r1''})$ unit.

In one embodiment, $p1''$ is 0.

In one embodiment, $p1''$ may be each independently an integer of 1 to 3, an integer of 2 to 3, or 3 for each $(SiR^{a1''}{}_{p1''}R^{b1''}{}_{q1''}R^{c1''}{}_{r1''})$ unit. In a preferable embodiment, $p1''$ is 3.

In one embodiment, $q1''$ is each independently an integer of 1 to 3, preferably an integer of 2 to 3, and more preferably 3 for each $(SiR^{a1''}{}_{p1''}R^{b1''}{}_{q1''}R^{c1''}{}_{r1''})$ unit.

In one embodiment, $p1''$ is 0, and $q1''$ is each independently an integer of 1 to 3, preferably an integer of 2 to 3, and more preferably 3 for each $(SiR^{a1''}{}_{p1''}R^{b1''}{}_{q1''}R^{c1''}{}_{r1''})$ unit.

$R^{b1'}$ is each independently at each occurrence a hydroxyl group or a hydrolyzable group. $R^{b1'}$ is preferably each independently at each occurrence a hydrolyzable group.

$R^{b1'}$ is preferably each independently at each occurrence $-OR^h$, $-OCOR^h$, $-O-N=CR^h{}_2$, $-NR^h{}_2$, $-NHR^h$, or halogen (in these formulae, $R^h$ represents a substituted or unsubstituted $C_{1-4}$ alkyl group), and more preferably $-OR^h$ (i.e., an alkoxy group). Examples of $R^h$ include unsubstituted alkyl groups such as a methyl group, an ethyl group, a propyl group, an isopropyl group, a n-butyl group, and an isobutyl group; and substituted alkyl groups such as a chloromethyl group. Among such groups, an alkyl group or in particular an unsubstituted alkyl group is preferable, and a methyl group or an ethyl group is more preferable. In one embodiment, $R^h$ is a methyl group, and in another embodiment, $R^h$ is an ethyl group.

$R^{c1'}$ is each independently at each occurrence a hydrogen atom or a monovalent organic group. Such a monovalent organic group does not include a group which forms the hydrolyzable group as mentioned above.

In $R^{c1'}$, the monovalent organic group is preferably a $C_{1-20}$ alkyl group, more preferably a $C_{1-6}$ alkyl group, and even more preferably a methyl group.

$p1'$ is each independently at each occurrence an integer of 0 to 3, $q1'$ is each independently at each occurrence an integer of 0 to 3, and $r1'$ is each independently at each occurrence an integer of 0 to 3. The sum of $p1'$, $q1'$, and $r1'$ is 3 in the $(SiR^{a1'}{}_{p1'}R^{b1'}{}_{q1'}R^{c1'}{}_{r1'})$ unit.

In one embodiment, $p1'$ is 0.

In one embodiment, $p1'$ may be each independently an integer of 1 to 3, an integer of 2 to 3, or 3 for each $(SiR^{a1'}{}_{p1'}R^{b1'}{}_{q1'}R^{c1'}{}_{r1'})$ unit. In a preferable embodiment, $p1'$ is 3.

In one embodiment, $q1'$ is each independently an integer of 1 to 3, preferably an integer of 2 to 3, and more preferably 3 for each $(SiR^{a1'}{}_{p1'}R^{b1'}{}_{q1'}R^{c1'}{}_{r1'})$ unit.

In one embodiment, $p1'$ is 0, and $q1'$ is each independently an integer of 1 to 3, preferably an integer of 2 to 3, and more preferably 3 for each $(SiR^{a1'}{}_{p1'}R^{b1'}{}_{q1'}R^{c1'}{}_{r1'})$ unit.

$R^{b1}$ is each independently at each occurrence a hydroxyl group or a hydrolyzable group. $R^{b1}$ is preferably each independently at each occurrence a hydrolyzable group.

$R^{c1}$ is each independently at each occurrence a hydrogen atom or a monovalent organic group. Such a monovalent organic group does not include a group which forms the hydrolyzable group as mentioned above.

In $R^{c1}$, the monovalent organic group is preferably a $C_{1-20}$ alkyl group, more preferably a $C_{1-6}$ alkyl group, and even more preferably a methyl group.

$p1$ is each independently at each occurrence an integer 0 to 3, $q1$ is each independently at each occurrence an integer of 0 to 3, and $r1$ is each independently at each occurrence an integer of 0 to 3. The sum of $p1$, $q1$, and $r1$ is 3 in the $(SiR^{a1}{}_{p1}R^{b1}{}_{q1}R^{c1}{}_{r1})$ unit.

In one embodiment, $p1$ is 0.

In one embodiment, $p1$ may be each independently an integer of 1 to 3, an integer of 2 to 3, or 3 for each $(SiR^{a1}{}_{p1}R^{b1}{}_{q1}R^{c1}{}_{r1})$ unit. In a preferable embodiment, $p1$ is 3.

In one embodiment, $q1$ is each independently an integer of 1 to 3, preferably an integer of 2 to 3, and more preferably 3 for each $(SiR^{a1}{}_{p1}R^{b1}{}_{q1}R^{c1}{}_{r1})$ unit.

In one embodiment, $p1$ is 0, and $q1$ is each independently an integer of 1 to 3, preferably an integer of 2 to 3, and more preferably 3 for each $(SiR^{a1}{}_{p1}R^{b1}{}_{q1}R^{c1}{}_{r1'})$ unit.

At least one $R^{b1}$, $R^{b1'}$, $R^{b1''}$, or $R^{b1'''}$ is present for each group represented by $R^{Si}$. That is to say, in formula (1) or (2), each group represented by $R^{Si}$ bonded to the N atom has at least one Si atom bonded to a hydroxyl group or a hydrolyzable group.

In other words, the group represented by $R^{Si}$ has at least one of:

a group represented by $-X^1-SiR^{a1}{}_{p1}R^{b1}{}_{q1}R^{c1}{}_{r1}$ (wherein $q1$ is an integer of 1 to 3, preferably $q1$ is 2 or 3, and more preferably $q1$ is 3, provided that the sum of $p1$, $q1$, and $r1$ is 3);

a group represented by —Z$^{1'}$—SiR$^{a1'}_{p1'}$R$^{b1'}_{q1'}$R$^{c1'}_{r1'}$ (wherein q1' is an integer of 1 to 3, preferably q1' is 2 or 3, and more preferably q1' is 3, provided that the sum of p1', q1', and r1' is 3); or a group represented by —Z$^{1''}$SiR$^{a1''}_{p1''}$R$^{b1''}_{q1''}$R$^{c1''}_{r1''}$ (wherein q1'' is an integer of 1 to 3, preferably q1'' is 2 or 3, and more preferably q1'' is 3, provided that the sum of p1'', q1'', and r1'' is 3); and a group represented by —Z$^{1'''}$—SiR$^{b1'''}_{q1'''}$R$^{c1'''}_{r1'''}$ (wherein q1''' is an integer of 1 to 3, preferably q1''' is 2 or 3, and more preferably q1''' is 3, provided that the sum of q1''' and r1''' is 3).

The Si atom bonded to a hydroxyl group or a hydrolyzable group preferably exists at the terminal moiety of the group represented by R$^{Si}$. In other words, preferably, the Si atom to which a hydroxyl group or a hydrolyzable group is bonded exists at the terminal moieties of formulae (1) and (2).

The group represented by R$^{Si}$ preferably has at least one of:

a group represented by —X$^1$—SiR$^{b1}_{q1}$R$^{c1}_{r1}$ (wherein q1 is an integer of 1 to 3, preferably q1 is 2 or 3, and more preferably q1 is 3, provided that the sum of q1 and r1 is 3);

a group represented by —Z$^{1'}$—SiR$^{b1'}_{q1'}$R$^{c1'}_{r1'}$ (wherein q1' is an integer of 1 to 3, preferably q1' is 2 or 3, and more preferably q1' is 3, provided that the sum of q1' and r1' is 3);

a group represented by —Z$^{1''}$—SiR$^{b1''}_{q1''}$R$^{c1''}_{r1''}$ (wherein q1' is an integer of 1 to 3, preferably q1'' is 2 or 3, and more preferably q1'' is 3, provided that the sum of q1'' and r1'' is 3); and a group represented by —Z$^{1'''}$—SiR$^{b1'''}_{q1'''}$R$^{c1'''}_{r1'''}$ (wherein q1''' is an integer of 1 to 3, preferably q1''' is 2 or 3, and more preferably q1''' is 3, provided that the sum of q1''' and r1''' is 3).

R$^{Si}$ is preferably —X$^1$—SiR$^{b1}_2$R$^{c1}$ or —X$^1$—SiR$^{b1}_3$, and more preferably —X$^1$—SiR$^{b1}_3$.

In one embodiment, when p1 is an integer of 1 to 3 in R$^{Si}$, R$^{a1}$ is preferably —Z$^{1'}$—SiR$^{b1'}_2$R$^{c1'}$ or —Z$^{1'}$—SiR$^{b1'}_3$, and more preferably —Z$^{1'}$—SiR$^{b1'}_3$. In this embodiment, p1 is preferably 2 or 3, and more preferably 3.

In one embodiment, when p1' is an integer of 1 to 3 in R$^{Si}$, R$^{a1'}$ is preferably —Z$^{1''}$—SiR$^{b1''}_2$R$^{c1''}$ or —Z$^{1''}$—SiR$^{b1''}_3$, and more preferably —Z$^{1''}$—SiR$^{b1''}_3$. In this embodiment, p1' is preferably 2 or 3, and more preferably 3.

In one embodiment, when p1'' is an integer of 1 to 3 in R$^{Si}$, R$^{a1''}$ is preferably —Z$^{1'''}$—SiR$^{b1'''}_2$R$^{c1'''}$ or —Z$^{1'''}$—SiR$^{b1'''}_3$, and more preferably —Z$^{1'''}$—SiR$^{b1'''}_3$. In this embodiment, p1'' is preferably 2 or 3, and more preferably 3.

In one embodiment, the fluoropolyether group-containing compound of the present disclosure is a compound represented by formula (1).

In one embodiment, the fluoropolyether group-containing compound of the present disclosure is a compound represented by formula (2).

In one embodiment, the fluoropolyether group-containing compound of the present disclosure is represented by formula (1) or (2) below:

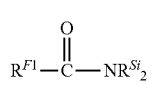

(1)

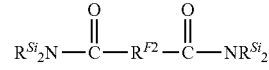

(2)

wherein
R$^{F1}$ is R$^{f1}$—R$^F$—O$_q$—;
R$^{F2}$ is —R$^{f2}_p$—R$^F$—O$_q$—;
R$^{f1}$ is a C$_{1-16}$ alkyl group optionally substituted with one or more fluorine atoms;
R$^{f2}$ is a C$_{1-6}$ alkylene group optionally substituted with one or more fluorine atoms;
R$^F$ is each independently at each occurrence represented by a formula: —(OC$_4$F$_8$)$_c$—(OC$_3$F$_6$)$_d$—(OC$_2$F$_4$)$_e$—(OCF$_2$)$_f$—, and specifically a formula: —(OC$_2$F$_4$)$_e$—(OCF$_2$)$_f$—, wherein c and d are each independently an integer of 0 or more and 30 or less; e and f are each independently an integer of 1 or more and 200 or less, preferably 5 or more and 200 or less, and more preferably 10 or more and 200 or less; the occurrence order of each repeating unit enclosed in parentheses provided with a subscript e or f is not limited in the formula; and the ratio of e to f is less than 0.9, preferably 0.2 or more and less than 0.9, more preferably 0.4 or more and 0.8 or less, and even more preferably 0.5 or more and 0.7 or less;
p and q are each independently 0 or 1;
R$^{Si}$ is each independently at each occurrence represented by formula (S1) below:

(S1)

X$^1$ is each independently at each occurrence a C$_{1-6}$ alkylene group or —(CH$_2$)$_{z7}$-phenylene-(CH$_2$)$_{z8}$—, preferably a C$_{1-6}$ alkylene group, and more preferably a C$_{1-3}$ alkylene group;
z7 is an integer of 0 to 6, and z8 is an integer of 1 to 6;
R$^{b1}$ is each independently at each occurrence a hydroxyl group or a hydrolyzable group; and
p1 and r1 are 0, and q1 is 3.

In one embodiment, the fluoropolyether group-containing compound of the present disclosure is represented by formula (1) or (2) below:

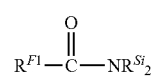

(1)

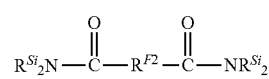

(2)

wherein
R$^{F1}$ is R$^{f1}$—R$^F$—O$_q$—;
R$^{F2}$ is —R$^{f2}_p$—R$^F$—O$_q$—;
the number average molecular weight of the group represented by R$^{F1}$ or R$^{F2}$ is in a range of 2,000 to 15,000, is preferably in a range of 3,000 to 15,000, is more preferably in a range of 3,500 to 15,000, may be in a range of 8,000 to 15,000, and may be in a range of 10,000 to 15,000;
R$^{f1}$ is a C$_{1-16}$ alkyl group optionally substituted with one or more fluorine atoms;
R$^{f2}$ is a C$_{1-6}$ alkylene group optionally substituted with one or more fluorine atoms;

$R^F$ is each independently at each occurrence represented by a formula: $-(OC_4F_8)_c-(OC_3F_6)_d-(OC_2F_4)_e-(OCF_2)_f-$, and specifically a formula: $-(OC_2F_4)_e-(OCF_2)_f-$, wherein c and d are each independently an integer of 0 or more and 30 or less; e and f are each independently an integer of 1 or more and 200 or less, preferably 5 or more and 200 or less, and more preferably 10 or more and 200 or less; the occurrence order of each repeating unit enclosed in parentheses provided with a subscript e or f is not limited in the formula; and the ratio of e to f is less than 0.9, preferably 0.2 or more and less than 0.9, more preferably 0.4 or more and 0.8 or less, and even more preferably 0.5 or more and 0.7 or less;

p and q are each independently 0 or 1;

$R^{Si}$ is each independently at each occurrence represented by formula (S1) below:

  (S1)

$X^1$ is each independently at each occurrence a $C_{1-6}$ alkylene group or $-(CH_2)_{z7}$-phenylene-$(CH_2)_{z8}-$, preferably a $C_{1-6}$ alkylene group, and more preferably a $C_{1-3}$ alkylene group;

z7 is an integer of 0 to 6, and z8 is an integer of 1 to 6;

$R^{b1}$ is each independently at each occurrence a hydroxyl group or a hydrolyzable group; and p1 and r1 are 0, and q1 is 3.

The compound represented by formula (1) or formula (2) can be produced by combining known methods.

As one embodiment, a method suitable for producing the fluoropolyether group-containing compound of the present disclosure will now be described below.

The fluoropolyether group-containing compound of the present disclosure can be produced by, for example, a method comprising reacting a compound represented by formula (1b) or (2b) with $HSiM_3$ (wherein M is each independently a halogen atom (i.e., I, Br, Cl, or F) or a $C_{1-6}$ alkoxy group, preferably a halogen atom, and more preferably Cl) to obtain a compound having $-SiM_3$ at the terminal (step (I)) and, as desired, reacting the compound with a compound represented by $R^{a1}L'$ ($R^{a1}$ has the same meaning as above, and L' represents a group capable of binding to $R^{a1}$) and/or a compound represented by $R^{b1}L''$ ($R^{b1}$ has the same meaning as above, and L'' represents a group capable of binding to $R^{b1}$) (step (II)).

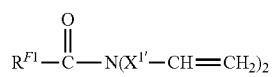  (1b)

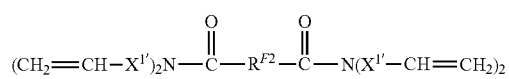  (2b)

In formulae (1b) and (2b), $R^{F1}$ and $R^{F2}$ have the same meanings as $R^{F1}$ and $R^{F2}$ in formulae (1) and (2), respectively. $X^{1'}$ represents a structure having two fewer carbon atoms than formulae (1) and (2). That is to say, $-X^{1'}-CH_2CH_2-$ derived from the structure represented by $-X^{1'}-CH=CH_2$ corresponds to $X^1$ in formulae (1) and (2).

The above steps are preferably carried out in a suitable solvent in the presence of a suitable catalyst.

Examples of the suitable catalyst include, but are not limited to, Pt, Pd, and Rh. Such a catalyst may be in any form, e.g., in the form of a complex.

The suitable solvent is not limited as long as it does not adversely affect the reaction, and examples include 1,3-bis(trifluoromethyl)benzene, perfluorobutyl ethyl ether, perfluorohexyl methyl ether, perfluorohexane, and hexafluorobenzene.

The reaction temperature in the reaction is not limited, and is usually 0 to 100° C. and preferably 50 to 80° C.; the reaction time is not limited, and is usually 60 to 600 minutes and preferably 120 to 300 minutes; and the reaction pressure is not limited, and is −0.2 to 1 MPa (gauge pressure) and conveniently is atmospheric pressure.

In another embodiment, the fluoropolyether group-containing compound of the present disclosure can be produced by, for example, a method comprising reacting the compound having $-SiM_3$ at the terminal obtained in step (I) with Hal-J-CH=CH$_2$ (wherein J represents Mg, Cu, Pd, or Zn, and Hal represents a halogen atom), and, as desired, a compound represented by $R^{a1}L'$ (wherein $R^{a1}$ has the same meaning as above, and L' represents a group capable of binding to $R^{a1}$) and/or a compound represented by $R^{b1}L''$ (wherein $R^{b1}$ has the same meaning as above, and L'' represents a group capable of binding to $R^{b1}$) (step (II')), and reacting the compound obtained in step (II') with $HSiM_3$ (wherein M is each independently a halogen atom or a $C_{1-6}$ alkoxy group) and, as desired, a compound represented by a formula: $R^{b1'}_{i}L'$ (wherein $R^{b1'}$ has the same meaning as above, L' represents a group capable of binding to $R^{b1'}$, and i' is an integer of 1 to 3)

and, as desired, a compound represented by a formula: $R^{c1'}_{j}L''$ (wherein $R^{c1'}$ has the same meaning as above, L'' represents a group capable of binding to $R^{c1'}$, and j' is an integer of 1 to 3).

The above steps are preferably carried out in a suitable solvent in the presence of a suitable catalyst.

Examples of the suitable catalyst include, but are not limited to, Pt, Pd, and Rh. Such a catalyst may be in any form, e.g., in the form of a complex.

The suitable solvent is not limited as long as it does not adversely affect the reaction, and examples include 1,3-bis(trifluoromethyl)benzene, perfluorobutyl ethyl ether, perfluorohexyl methyl ether, perfluorohexane, and hexafluorobenzene.

The reaction temperature in the reaction is not limited, and is usually 0 to 100° C. and preferably 50 to 80° C.; the reaction time is not limited, and is usually 60 to 600 minutes and preferably 120 to 300 minutes; and the reaction pressure is not limited, and is −0.2 to 1 MPa (gauge pressure) and conveniently is atmospheric pressure.

The compounds represented by formulae (1b) and (2b) can be produced by, for example, introducing a group having a double bond into the terminal moiety of the compounds represented by formulae (1a) and (2a). Specifically, the compound can be obtained by reacting the $R^x$ moiety at the terminal of a compound represented by formula (1a) or (2a) below with an amine compound (such as diallylamine).

  (1a)

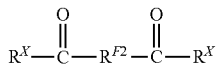
(2a)

In formulae (1a) and (2a), $R^{F1}$ and $R^{F2}$ have the same meanings as $R^{F1}$ and $R^{F2}$ in formulae (1) and (2), respectively. $R^X$ is, for example, a hydrogen atom, a hydroxyl group, an alkoxyl group having 1 to 10 carbon atoms, a phenol group, a sulfonyl group, halogen, or the like, and is specifically a hydroxyl group.

The above step is preferably carried out in a suitable solvent in the presence of a suitable base.

The suitable base is not particularly limited, and examples include lithium hydroxide, sodium hydroxide, potassium hydroxide, sodium carbonate, potassium carbonate, sodium hydrogencarbonate, potassium hydrogencarbonate, and tertiary amine (triethylamine, pyridine, diisopropylethylamine, and 2,6-lutidine). Such a catalyst may be in any form, e.g., in the form of a complex.

The suitable solvent is not limited as long as it does not adversely affect the reaction, and examples include 1,3-bis(trifluoromethyl)benzene, perfluorobutyl ethyl ether, perfluorohexyl methyl ether, perfluorohexane, and hexafluorobenzene.

The reaction temperature in the reaction is not limited, and is usually 0 to 100° C. and preferably 40 to 80° C.; the reaction time is not limited, and is usually 60 to 600 minutes and preferably 120 to 240 minutes; and the reaction pressure is not limited, and is −0.2 to 1 MPa (gauge pressure) and conveniently is atmospheric pressure.

The reaction conditions when producing the fluoropolyether group-containing silane compound of the present disclosure can be suitably regulated to a preferable range by those skilled in the art.

Below, the composition of the present disclosure (for example, a surface-treating agent) will now be described.

The composition (for example, a surface-treating agent) of the present disclosure contains at least one fluoropolyether group-containing compound represented by formula (1) or formula (2).

In one embodiment, the composition (for example, a surface-treating agent) of the present disclosure may contain the fluoropolyether group-containing compounds represented by formula (1) and formula (2). The composition (for example, a surface-treating agent) of this embodiment can contribute to the formation of a cured layer having good friction durability. The friction durability of a cured layer formed using the composition of this embodiment is improved, and slickness on the surface of the cured layer is improved. It is considered that, in the composition of this embodiment, a secondary structure of the $R^F$ moiety likely has a spiral structure, the polymer density per unit area and the crosslink density of the silane coupling agent are increased, and accordingly the strength of the cured layer is increased.

In one embodiment, the lower limit of the ratio (molar ratio) of the fluoropolyether group-containing compound represented by formula (2) to the total of the fluoropolyether group-containing compounds represented by formulae (1) and (2) contained in the composition (for example, a surface-treating agent) of the present disclosure may be preferably 0.001, more preferably 0.002, even more preferably 0.005, yet more preferably 0.01, particularly preferably 0.02, and especially 0.05. The upper limit of the ratio (molar ratio) of the fluoropolyether group-containing compound represented by formula (2) to the total of the fluoropolyether group-containing compounds represented by formulae (1) and (2) may be preferably 0.35, more preferably 0.30, even more preferably 0.20, and yet more preferably 0.15 or 0.10. The ratio (molar ratio) of the fluoropolyether group-containing compound represented by formula (2) to the total of the fluoropolyether group-containing compounds represented by formulae (1) and (2) is preferably 0.001 or more and 0.30 or less, more preferably 0.001 or more and 0.20 or less, even more preferably 0.002 or more and 0.20 or less, yet more preferably 0.005 or more and 0.20 or less, and particularly preferably 0.01 or more and 0.20 or less, such as 0.02 or more and 0.20 or less (specifically 0.15 or less) or 0.05 or more and 0.20 or less (specifically 0.15 or less). By containing the fluoropolyether group-containing compound represented by formula (2) in the above range, the composition (for example, a surface-treating agent) of this embodiment can contribute to the formation of a cured layer having good friction durability.

In one embodiment, the lower limit of the ratio (molar ratio) of the fluoropolyether group-containing compound represented by formula (2) to the total of the fluoropolyether group-containing compounds represented by formulae (1) and (2) contained in the composition (for example, a surface-treating agent) of the present disclosure may be preferably 0.001, more preferably 0.002, even more preferably 0.005, yet more preferably 0.01, particularly preferably 0.02, and especially 0.05. The upper limit of the ratio (molar ratio) of the fluoropolyether group-containing compound represented by formula (2) to the total of the fluoropolyether group-containing compounds represented by formulae (1) and (2) may be preferably 0.70, more preferably 0.60, even more preferably 0.50, yet more preferably 0.40, further preferably 0.30, such as 0.20, and specifically 0.10. The ratio (molar ratio) of the fluoropolyether group-containing compound represented by formula (2) to the total of the fluoropolyether group-containing compounds represented by formulae (1) and (2) may be 0.001 or more and 0.70 or less, may be 0.001 or more and 0.60 or less, may be 0.001 or more and 0.50 or less, may be 0.002 or more and 0.40 or less, may be 0.005 or more and 0.30 or less, may be 0.01 or more and 0.20 or less, and is, for example, 0.02 or more and 0.20 or less (specifically 0.15 or less) or 0.05 or more and 0.20 or less (specifically 0.15 or less).

In one embodiment, the lower limit of the ratio (molar ratio) of the fluoropolyether group-containing compound represented by formula (1) to the total of the fluoropolyether group-containing compounds represented by formulae (1) and (2) contained in the composition (for example, a surface-treating agent) of the present disclosure may be preferably 0.001, more preferably 0.002, even more preferably 0.005, yet more preferably 0.01, particularly preferably 0.02, and especially 0.05. The upper limit of the ratio (molar ratio) of the fluoropolyether group-containing compound represented by formula (1) to the total of the fluoropolyether group-containing compounds represented by formulae (1) and (2) may be preferably 0.70, more preferably 0.60, even more preferably 0.50, yet more preferably 0.40, further preferably 0.30, such as 0.20, and specifically 0.10. The ratio (molar ratio) of the fluoropolyether group-containing compound represented by formula (1) to the total of the fluoropolyether group-containing compounds represented by formulae (1) and (2) may be 0.001 or more and 0.70 or less, may be 0.001 or more and 0.60 or less, may be 0.001 or more and 0.50 or less, may be 0.002 or more and 0.40 or less, may be 0.005 or more and 0.30 or less, may be 0.01 or more and 0.20 or less, and is, for example, 0.02 or more and 0.20 or less (specifically 0.15 or less) or 0.05 or more and 0.20 or less (specifically 0.15 or less).

The composition (for example, a surface-treating agent) of the present disclosure is capable of imparting water-repellency, oil-repellency, antifouling properties, surface slickness, and friction durability to a substrate, and can be suitably used as, but is not limited to, an antifouling coating agent or a water-proof coating agent.

The composition (for example, a surface-treating agent) of the present disclosure may further contain a solvent, a (non-reactive) fluoropolyether compound that can be understood as a fluorine-containing oil or preferably a perfluoro (poly)ether compound (hereinafter, collectively referred to as a "fluorine-containing oil"), a (non-reactive) silicone compound that can be understood as a silicone oil (hereinafter, referred to as "silicone oil"), a catalyst, a surfactant, a polymerization inhibitor, a sensitizer, and the like.

Examples of the solvent include aliphatic hydrocarbons such as hexane, cyclohexane, heptane, octane, nonane, decane, undecane, dodecane, and mineral spirits; aromatic hydrocarbons such as benzene, toluene, xylene, naphthalene, and solvent naphtha; esters such as methyl acetate, ethyl acetate, propyl acetate, n-butyl acetate, isopropyl acetate, isobutyl acetate, cellosolve acetate, propylene glycol methyl ether acetate, carbitol acetate, diethyl oxalate, ethyl pyruvate, ethyl 2-hydroxybutyrate, ethyl acetoacetate, amyl acetate, methyl lactate, ethyl lactate, methyl 3-methoxypropionate, ethyl 3-methoxypropionate, methyl 2-hydroxyisobutyrate, and ethyl 2-hydroxyisobutyrate; ketones such as acetone, methyl ethyl ketone, methyl isobutyl ketone, 2-hexanone, cyclohexanone, methyl amino ketone, and 2-heptanone; glycol ethers such as ethyl cellosolve, methyl cellosolve, methyl cellosolve acetate, ethyl cellosolve acetate, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether, and ethylene glycol monoalkyl ether; alcohols such as methanol, ethanol, iso-propanol, n-butanol, isobutanol, tert-butanol, sec-butanol, 3-pentanol, octyl alcohol, 3-methyl-3-methoxybutanol, and tert-amyl alcohol; glycols such as ethylene glycol and propylene glycol; cyclic ethers such as tetrahydrofuran, tetrahydropyran, and dioxane; amides such as N,N-dimethylformamide and N,N-dimethylacetamide; ether alcohols such as methyl cellosolve, cellosolve, isopropyl cellosolve, butyl cellosolve, and diethylene glycol monomethyl ether; diethylene glycol monoethyl ether acetate; and fluorine-containing solvents such as 1,1,2-trichloro-1,2,2-trifluoroethane, 1,2-dichloro-1,1,2,2-tetrafluoroethane, dimethyl sulfoxide, 1,1-dichloro-1,2,2,3,3-pentafluoropropane (HCFC 225), Zeorora H, HFE 7100, HFE 7200, and HFE 7300. Alternatively, the solvent may be a mixed solvent of two or more such solvents.

The fluorine-containing oil is not limited, and examples include compounds (perfluoro(poly)ether compounds) represented by general formula (3) below:

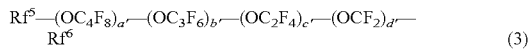
(3)

wherein Rf$^5$ represents a C$_{1-16}$ alkyl group optionally substituted with one or more fluorine atoms (preferably a C$_{1-16}$ perfluoroalkyl group), Rf$^6$ represents a C$_{1-16}$ alkyl group optionally substituted with one or more fluorine atoms (preferably a C$_{1-16}$ perfluoroalkyl group), a fluorine atom, or a hydrogen atom, and Rf$^5$ and Rf$^6$ are more preferably each independently a C$_{1-3}$ perfluoroalkyl group.

a', b', c', and d' respectively represent the numbers of 4 repeating units of perfluoro(poly)ether constituting the main backbone of the polymer and are mutually independently an integer of 0 or more and 300 or less, and the sum of a', b', c', and d' is at least 1, preferably 1 to 300, and more preferably 20 to 300. The occurrence order of each repeating unit enclosed in parentheses provided with a subscript a', b', c', or d' is not limited in the formula. Among these repeating units, —(OC$_4$F$_8$)— may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)—, and (OCF$_2$CF(C$_2$F$_5$))—, and is preferably —(OCF$_2$CF$_2$CF$_2$CF$_2$)—. —(OC$_3$F$_6$)— may be any of —(OCF$_2$CF$_2$CF$_2$)—, —(OCF(CF$_3$)CF$_2$)—, and (OCF$_2$CF(CF$_3$))—, and is preferably —(OCF$_2$CF$_2$CF$_2$)—. —(OC$_2$F$_4$)— may be any of —(OCF$_2$CF$_2$)— and (OCF(CF$_3$))—, and is preferably —(OCF$_2$CF$_2$)—.

Examples of the perfluoro(poly)ether compound represented by general formula (3) include compounds represented by any of general formulae (3a) and (3b) below (which may be used singly or as a mixture of two or more):

(3a)

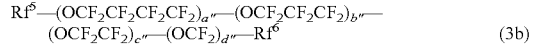
(3b)

In these formulae, Rf$^5$ and Rf$^6$ are as described above; in formula (3a), b" is an integer of 1 or more and 100 or less; and in formula (3b), a" and b" are each independently an integer of 0 or more and 30 or less, and c" and d" are each independently an integer of 1 or more and 300 or less. The occurrence order of each repeating unit enclosed in parentheses provided with a subscript a", b", c", or d" is not limited in the formulae.

From another viewpoint, the fluorine-containing oil may be a compound represented by general formula Rf$^3$—F wherein Rf$^3$ is a C$_{5-16}$ perfluoroalkyl group. The fluorine-containing oil may be a chlorotrifluoroethylene oligomer.

The fluorine-containing oil may have an average molecular weight of 500 to 10,000. The molecular weight of the fluorine-containing oil may be measured using gel permeation chromatography (GPC).

The fluorine-containing oil may be contained in an amount of, for example, 0 to 50 mass %, preferably 0 to 30 mass %, and more preferably 0 to 5 mass % based on the composition (for example, a surface-treating agent) of the present disclosure. In one embodiment, the composition of the present disclosure is substantially free of the fluorine-containing oil. Being substantially free of the fluorine-containing oil means that the fluorine-containing oil is not contained at all, or an extremely small amount of the fluorine-containing oil may be contained.

The fluorine-containing oil contributes to increasing the surface slickness of a layer formed of the composition (for example, a surface-treating agent) of the present disclosure.

For example, the silicone oil may be straight or cyclic silicone oil having 2,000 or fewer siloxane bonds. The straight silicone oil may be so-called straight silicone oil or modified silicone oil. Examples of the straight silicone oil include dimethyl silicone oil, methyl phenyl silicone oil, and methyl hydrogen silicone oil. Examples of the modified silicone oil include those obtained by modifying straight silicone oil with alkyl, aralkyl, polyether, higher fatty acid ester, fluoroalkyl, amino, epoxy, carboxyl, alcohol, or the like. Examples of the cyclic silicone oil include cyclic dimethylsiloxane oil.

In the composition (for example, a surface-treating agent) of the present disclosure, such silicone oil may be contained in an amount of, for example, 0 to 300 parts by mass, and preferably 50 to 200 parts by mass, based on total 100 parts by mass of the fluoropolyether group-containing silane compound of the present disclosure (in the case of two or more kinds, the total thereof, and the same applies below).

Silicone oil contributes to increasing the surface slickness of a layer formed of the composition (for example, a surface-treating agent) of the present disclosure.

Examples of the catalyst include acids (such as acetic acid and trifluoroacetic acid), bases (such as ammonia, triethylamine, and diethylamine), and transition metals (such as Ti, Ni, and Sn).

The catalyst promotes hydrolysis and dehydrative condensation of the fluoropolyether group-containing silane compound of the present disclosure, and promotes formation of a layer formed of the composition (for example, a surface-treating agent) of the present disclosure.

Examples of other components include, in addition to those described above, tetraethoxysilane, methyltrimethoxysilane, 3-aminopropyltrimethoxysilane, 3-glycidoxypropyltrimethoxysilane, and methyltriacetoxysilane.

In one embodiment, the compound represented by formula (2) may be contained in an amount of 70 mol % or less, may be contained in an amount of 60 mol % or less, may be contained in an amount of 50 mol % or less, may be contained in an amount of 0.001 mol % or more, may be contained in an amount of 0.01 mol % or more, and may be contained in an amount of 0.1 mol % or more, based on the total of the compound represented by formula (1), the compound represented by formula (2), and the fluorine-containing oil. The compound represented by formula (2) may be contained in an amount of, for example, 1 to 70 mol %, and may be contained in an amount of 5 to 50 mol %, based on the total of the compound represented by formula (1), the compound represented by formula (2), and the fluorine-containing oil.

In one embodiment, the composition (for example, a surface-treating agent) of the present disclosure contains the compound represented by formula (1), the compound represented by formula (2), and the fluorine-containing oil.

In this embodiment, the fluorine-containing oil may be contained in an amount of, for example, 0.001 mol % or more, may be contained in an amount of 0.01 mol % or more, may be contained in an amount of 1.0 mol % or more, may be contained in an amount of 50 mol % or less, may be contained in an amount of 40 mol % or less, may be contained in an amount of 30 mol % or less, and may be contained in an amount of 10 mol % or less, based on the total of the compound represented by formula (1), the compound represented by formula (2), and the fluorine-containing oil. The fluorine-containing oil may be contained in an amount of, for example, 0.001 to 50 mol %, and may be contained in an amount of 0.01 to 40 mol %, based on the total of the compound represented by formula (1), the compound represented by formula (2), and the fluorine-containing oil.

In this embodiment, preferably the compound represented by formula (2) is contained in an amount of 0.001 to 70 mol %, and the fluorine-containing oil is contained in an amount of 0.001 to 50 mol %, more preferably the compound represented by formula (2) is contained in an amount of 0.01 to 60 mol %, and the fluorine-containing oil is contained in an amount of 0.01 to 40 mol %, and even more preferably the compound represented by formula (2) is contained in an amount of 0.1 to 50 mol %, and the fluorine-containing oil is contained in an amount of 0.1 to 30 mol %, based on the total of the compound represented by formula (1), the compound represented by formula (2), and the fluorine-containing oil.

The composition (for example, a surface-treating agent) of this embodiment can contribute to the formation of a cured layer having good friction durability. Moreover, the friction durability of a cured layer formed using the composition of this embodiment is improved, and slickness on the surface of the cured layer is improved. Also, it is considered that, in the composition of this embodiment, a secondary structure of the $R^F$ moiety likely has a spiral structure, the polymer density per unit area and the crosslink density of the silane coupling agent are increased, and accordingly the strength of the cured layer is increased.

In one embodiment, the composition (for example, a surface-treating agent) of the present disclosure contains the compound represented by formula (1), the compound represented by formula (2), and the fluorine-containing oil.

In this embodiment, the compound represented by formula (2) may be contained in an amount of 0.001 mol % or more and less than 50 mol %, may be contained in an amount of 0.1 mol % or more and less than 50 mol %, may be contained in an amount of 1 mol % or more and less than 50 mol %, and, for example, may be contained in an amount of 10 mol % or more and less than 50 mol %, based on the total of the compound represented by formula (1) and the compound represented by formula (2).

In one embodiment, the composition (for example, a surface-treating agent) of the present disclosure contains the compound represented by formula (1), the compound represented by formula (2), and the fluorine-containing oil.

In this embodiment, the compound represented by formula (1) may be contained in an amount of 0.001 mol % or more and less than 50 mol %, may be contained in an amount of 0.1 mol % or more and less than 50 mol %, may be contained in an amount of 10 mol % or more and less than 50 mol %, and, for example, may be contained in an amount of 20 mol % or more and less than 50 mol %, or 30 mol % or more and less than 50 mol %, based on the total of the compound represented by formula (1) and the compound represented by formula (2).

In one embodiment, the composition (for example, a surface-treating agent) of the present disclosure contains the compound represented by formula (1), the compound represented by formula (2), and the fluorine-containing oil.

In this embodiment, the compound represented by formula (2) may be contained in an amount of 35 mol % or more and less than 65 mol %, and may be contained in an amount of 40 mol % or more and less than 60 mol %, based on the total of the compound represented by formula (1) and the compound represented by formula (2).

The composition of the present disclosure can be used as a surface-treating agent for surface treatment of a substrate.

The surface-treating agent of the present disclosure can be formed into pellets by impregnating with a porous material such as a porous ceramic material or a metal fiber such as a fiber obtained by, for example, solidifying steel wool in a cotton-like form. Such pellets can be used in, for example, vacuum deposition.

Below, the article of the present disclosure will now be described.

The article of the present disclosure contains a substrate and a layer on the surface of the substrate (a surface-treating layer), wherein the layer is formed of the fluoropolyether group-containing silane compound of the present disclosure or a surface-treating agent containing the fluoropolyether group-containing silane compound (hereinafter, these are simply referred to as "the surface-treating agent of the present disclosure" collectively).

The substrate usable herein may be composed of any suitable material such as glass, resin (which may be natural or synthetic resin such as a commonly used plastic material, and may be in the form of a plate, a film, or the like), metal, ceramics, semiconductors (such as silicon and germanium), fiber (such as woven fabric and nonwoven fabric), fur, leather, wood, pottery, stone, and building materials.

For example, when the article to be produced is an optical member, the material constituting the surface of the substrate may be a material for an optical member, such as glass or a transparent plastic. When the article to be produced is an optical member, a layer (or film) such as a hard coat layer or an antireflection layer may be formed on the surface (the outermost layer) of the substrate. The antireflection layer may be any of a single-layer antireflection layer and a multi-layer antireflection layer. Examples of inorganic substances usable in the antireflection layer include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, and $WO_3$. One of these inorganic substances may be used singly, or two or more may be used in combination (for example, as a mixture). In the case of a multi-layer antireflection layer, $SiO_2$ and/or $SiO$ is preferably used in the outermost layer thereof. When the article to be produced is an optical glass component for a touch panel, a part of the surface of the substrate (glass) may have a transparent electrode such as a thin film in which indium tin oxide (ITO), indium zinc oxide, or the like is used. The substrate, according to its specific configuration or the like, may have an insulating layer, an adhesive layer, a protecting layer, a decorated frame layer (I-CON), an atomizing film layer, a hard coating layer, a polarizing film, a phase difference film, a liquid crystal display module, or the like.

The shape of the substrate is not limited. The surface region of the substrate, on which a layer formed of the surface-treating agent of the present disclosure is to be formed, is at least a part of the substrate surface, and may be suitably determined according to the application, specific configuration, and the like of an article to be produced.

The substrate, or at least the surface portion thereof, may be composed of a material originally having a hydroxyl group. Examples of the material include glass as well as metal (in particular, base metal) wherein a natural oxidized film or a thermal oxidized film is formed on the surface, ceramics, semiconductors, and the like. Alternatively, when the substrate has an insufficient amount of a hydroxyl group or when the substrate originally does not have a hydroxyl group as in resin and the like, a pre-treatment may be performed on the substrate to thereby introduce or increase a hydroxyl group on the surface of the substrate. Examples of such a pre-treatment include a plasma treatment (e.g., corona discharge) and ion beam irradiation. The plasma treatment can be suitably utilized to not only introduce or increase a hydroxyl group on the substrate surface, but also clean the substrate surface (remove foreign matter and the like). Another example of such a pre-treatment includes a method wherein a monolayer of a surface adsorbent having a carbon-carbon unsaturated bonding group is formed on the surface of the substrate by a LB method (a Langmuir-Blodgett method), a chemical adsorption method, or the like beforehand, and, thereafter, cleaving the unsaturated bond under an atmosphere containing oxygen, nitrogen, or the like.

Alternatively, the substrate, or at least a surface portion thereof, may be composed of a material containing another reactive group, such as a silicone compound having one or more Si—H groups, or alkoxysilane.

Then, a layer of the surface-treating agent of the present disclosure is formed on the surface of the substrate, this layer is post-treated as necessary, and thereby a layer is formed from the surface-treating agent of the present disclosure.

A layer of the surface-treating agent of the present disclosure can be formed by applying the surface-treating agent to the surface of the substrate such that the surface is coated with the surface-treating agent. The coating method is not limited. For example, a wet coating method and a dry coating method can be used.

Examples of the wet coating method include dip coating, spin coating, flow coating, spray coating, roll coating, gravure coating, and similar methods.

Examples of the dry coating method include deposition (usually, vacuum deposition), sputtering, CVD, and similar methods. Specific examples of the deposition method (usually, a vacuum deposition method) include resistive heating, electron beam, high-frequency heating using microwave or the like, ion beam, and similar methods. Specific examples of the CVD method include plasma-CVD, optical CVD, thermal CVD, and similar methods.

Furthermore, coating by an atmospheric pressure plasma method can be performed.

When using the wet coating method, the surface-treating agent of the present disclosure can be applied to the substrate surface after being diluted with a solvent. From the viewpoint of the stability of the surface-treating agent of the present disclosure and the volatility of solvents, the following solvents are preferably used: perfluoroaliphatic hydrocarbons having 5 to 12 carbon atoms (such as perfluorohexane, perfluoromethylcyclohexane, and perfluoro-1,3-dimethylcyclohexane); polyfluoroaromatic hydrocarbons (such as bis(trifluoromethyl)benzene); polyfluoroaliphatic hydrocarbons (such as $C_6F_{13}CH_2CH_3$ (such as Asahiklin (registered trademark) AC-6000 manufactured by Asahi Glass Co., Ltd., and 1,1,2,2,3,3,4-heptafluorocyclopentane (such as Zeorora (registered trademark) H manufactured by Zeon Corporation)); alkyl perfluoroalkyl ethers (the perfluoroalkyl group and the alkyl group may be straight or branched) such as hydrofluoroether (HFE) (such as perfluoropropylmethyl ether ($C_3F_7OCH_3$) (such as Novec (trademark) 7000 manufactured by Sumitomo 3M Limited), perfluorobutyl methyl ether ($C_4F_9OCH_3$) (such as Novec (trademark) 7100 manufactured by Sumitomo 3M Limited), perfluorobutyl ethyl ether ($C_4F_9OC_2H_5$) (such as Novec (trademark) 7200 manufactured by Sumitomo 3M Limited), and perfluorohexyl methyl ether ($C_2F_5CF(OCH_3)C_3F_7$) (such as Novec (trademark) 7300 manufactured by Sumitomo 3M Limited), or $CF_3CH_2OCF_2CHF_2$ (such as Asahiklin (registered trademark) AE-3000 manufactured by Asahi Glass Co., Ltd.)). One of these solvents can be used singly, or two or more can be used as a mixture. In particular, hydrofluoroether is preferable, and perfluorobutyl methyl ether ($C_4F_9OCH_3$) and/or perfluorobutyl ethyl ether ($C_4F_9OC_2H_5$) is particularly preferable.

When using the dry coating method, the surface-treating agent of the present disclosure may be directly subjected to the dry coating method, or may be diluted with the above solvent before being subjected to the dry coating method.

A layer of the surface-treating agent is preferably formed such that the surface-treating agent of the present disclosure coexists with a catalyst for hydrolysis and dehydrative condensation in the layer. Conveniently, in the case of a wet coating method, the surface-treating agent of the present disclosure is diluted with a solvent, and then, immediately before application to the substrate surface, a catalyst may be added to the diluted solution of the surface-treating agent of the present disclosure. In the case of a dry coating method, the surface-treating agent of the present disclosure to which a catalyst has been added is directly used in a deposition (usually vacuum deposition) treatment, or a pellet-like material may be used in a deposition (usually vacuum deposition) treatment, wherein the pellets are obtained by impregnating a porous body of metal such as iron or copper with the surface-treating agent of the present disclosure to which the catalyst has been added.

The catalyst may be any suitable acid or base. The acid catalyst may be, for example, acetic acid, formic acid, or trifluoroacetic acid. The base catalyst may be, for example, ammonia or organic amine.

In the above-described manner, a layer derived from the surface-treating agent of the present disclosure is formed on the substrate surface, and the article of the present disclosure is produced. The layer thus obtained has both high surface slickness and high friction durability. The layer may have not only high friction durability but also have, depending on the formulation of the surface-treating agent used, water-repellency, oil-repellency, antifouling properties (e.g., preventing grime such as fingerprints from adhering), water-proof properties (preventing water from entering electronic components and the like), surface slickness (or lubricity, such as removability by wiping of grime such as fingerprints, and excellent tactile sensations), and the like, and may be suitably used as a functional thin film.

That is to say, the present disclosure further relates to an optical material having a layer derived from the surface-treating agent of the present disclosure as the outermost layer.

The optical material preferably includes a wide variety of optical materials in addition to optical materials relating to displays and the like as exemplified below: for example, displays such as cathode ray tubes (CRTs; e.g., PC monitors), liquid crystal displays, plasma displays, organic EL displays, inorganic thin-film EL dot matrix displays, rear projection displays, vacuum fluorescent displays (VFDs), field emission displays (FEDs); protective plates for such displays; and those obtained by performing an antireflection film treatment on their surfaces.

The article having a layer obtained according to the present disclosure may be, but is not limited to, an optical member. Examples of the optical member include lenses of glasses or the like; front surface protective plates, antireflection plates, polarizing plates, and anti-glare plates for displays such as PDPs and LCDs; touch panel sheets for devices such as mobile phones and personal digital assistants; disc surfaces of optical discs such as Blu-ray (registered trademark) discs, DVD discs, CD-Rs, and MOs; optical fibers; and display surfaces of watches and clocks.

The article having a layer obtained according to the present disclosure may be an automobile interior/exterior material. Examples of exterior materials include windows, light covers, and aftermarket camera covers. Examples of interior materials include instrument panel covers, navigation system touch panels, and decorative interior materials.

The article having a layer obtained according to the present disclosure may be medical equipment or a medical material.

The thickness of the layer is not limited. The thickness of the layer in the case of an optical member is in the range of 1 to 50 nm, 1 to 30 nm, and preferably 1 to 15 nm, from the viewpoint of optical performance, surface slickness, friction durability, and antifouling properties.

Embodiments have been described above, but it will be understood that various modifications can be made to embodiments and details without departing from the spirit and the scope of the claims.

EXAMPLES

The present invention will now be described more specifically by way of the Examples below, but the present disclosure is not limited to the Examples. In the Examples, all chemical formulae shown below indicate average compositions, and the occurrence order of repeating units (such as $(OCF_2CF_2)$ and $(OCF_2)$) constituting perfluoropolyether is not limited.

Synthetic Example 1

First, 6.0 g of a mixture of $CF_3$—$(OCF_2CF_2)_m$—$(OCF_2)_n$—COOH (m≈16, n≈28) and $HOCOCF_2$—$(OCF_2CF_2)_m$—$(OCF_2)_n$—COOH (m≈16, n≈28) (provided that the content of $HOCOCF_2$—$(OCF_2CF_2)_m$—$(OCF_2)_n$—COOH was 14 mol %) was dissolved in 6.0 g of 1,3-bis(trifluoromethyl)benzene, and ice-cooled. After 0.3 g of thionyl chloride was added dropwise to the solution, further, 0.01 mg of N,N-dimethylformamide was added, and the mixture was stirred at room temperature for 24 hours. After thionyl chloride was distilled off from the reaction solution, 0.18 g of diallylamine and 0.2 g of triethylamine were added, and the mixture was heated to 50° C. and stirred for 3 hours. The end point of the reaction was confirmed by $^{19}F$-NMR according to that the chemical shift of —$CF_2$— at the carbonyl group α position of $CF_2$—$(OCF_2CF_2)_m$—$(OCF_2)_n$—COOH shifted to a low magnetic field, and by $^1H$-NMR according to that the methylene proton at the amino group α position of diallylamine shifted to a low magnetic field. 1N-Hydrochloric acid was added to the reaction solution for separation, and the lower phase was washed with water, dried over magnesium sulfate, and concentrated. The resulting concentrate was dissolved in perfluorohexane and washed with acetone three times to obtain a mixture containing a polyether group-containing compound (A) and a polyether group-containing compound (A').

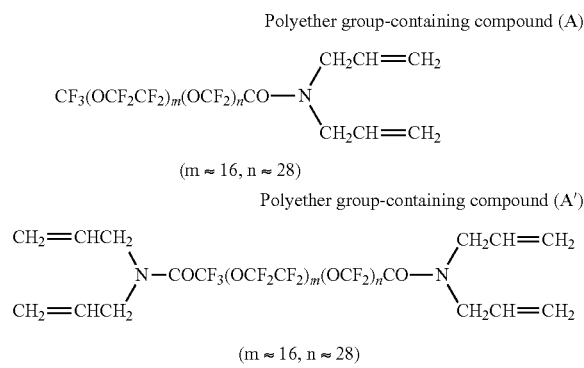

Synthetic Example 2

First, 5.0 g of the mixture obtained in Synthetic Example 1 was dissolved in 10 ml of 1,3-bis(trifluoromethyl)benzene, then 0.02 g of triacetoxymethylsilane and 0.06 ml of a xylene solution containing a 2% Pt complex of 1,3-divinyl-1,1,3,3-tetramethyldisiloxane were added, 1.0 g of trichlorosilane was added, and the mixture was stirred at 10° C. for 30 minutes. Subsequently, the solution was heated to 60° C. and stirred for 4 hours. Thereafter, volatiles were distilled off from the resulting solution under reduced pressure, then a mixed solution of 0.1 g of methanol and 3.0 g of trimethyl orthoformate was added, and the mixture was heated to 60° C. and stirred for 3 hours. Thereafter, purification was performed, and thus 4.7 g of a mixture containing the following polyether group-containing compound (B) and polyether group-containing compound (B') having trimethoxysilyl groups at terminals was obtained (the e/f ratio was 0.57).

Polyether group-containing compound (B)

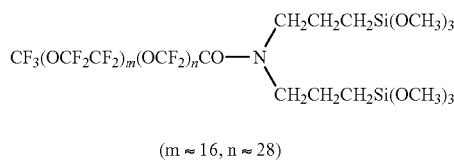

(m ≈ 16, n ≈ 28)

Polyether group-containing compound (B')

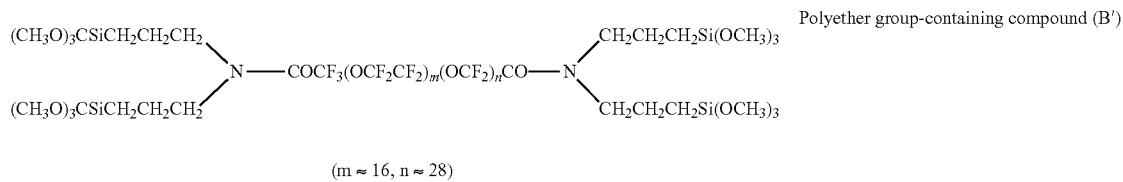

(m ≈ 16, n ≈ 28)

Synthetic Example 3

The same operations as in Synthetic Example 1 were carried out except that 6.0 g of a mixture containing $CF_3$—$(OCF_2CF_2)_m$—$(OCF_2)_n$—COOH (m≈54, n≈90) and HOC-OCF$_2$—$(OCF_2CF_2)_m$—$(OCF_2)_n$—COOH (m≈54, n≈90) was used (provided that the content of HOCOCF$_2$—$(OCF_2CF_2)_m$—$(OCF_2)_n$—COOH was 7 mol %), and thus 6.0 g of a mixture containing a polyether group-containing compound (C) and a polyether group-containing compound (C') was obtained.

Polyether group-containing compound (C)

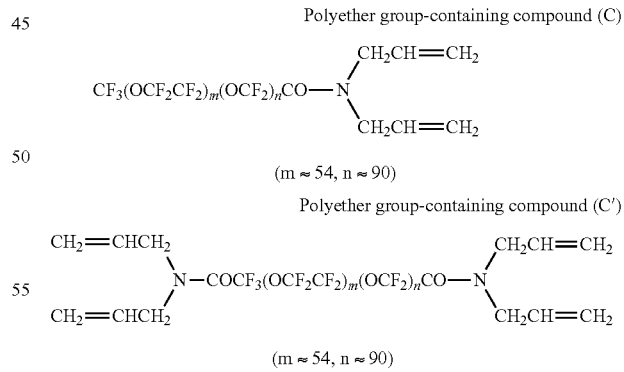

(m ≈ 54, n ≈ 90)

Polyether group-containing compound (C')

$CH_2$=$CHCH_2$\
\phantom{xxxxxx}N—COCF$_3$(OCF$_2$CF$_2$)$_m$(OCF$_2$)$_n$CO—N(CH$_2$CH=CH$_2$)$_2$\
$CH_2$=$CHCH_2$/

(m ≈ 54, n ≈ 90)

Synthetic Example 4

The same operations as in Synthetic Example 2 were carried out except that 5.8 g of the mixture obtained in Synthetic Example 3 was used, and thus 5.8 g of a mixture containing a polyether group-containing compound (D) and a polyether group-containing compound (D') was obtained (the e/f ratio was 0.60).

Polyether group-containing compound (D)

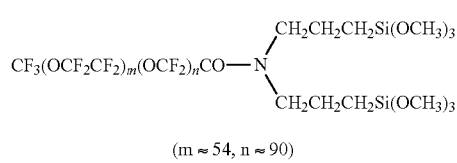

(m ≈ 54, n ≈ 90)

Polyether group-containing compound (D')

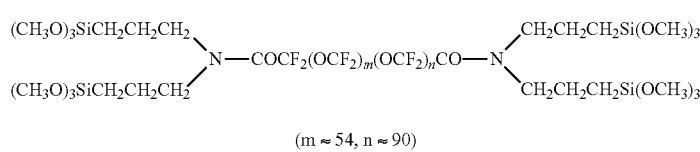

(m ≈ 54, n ≈ 90)

Synthetic Example 5

The same operations as in Synthetic Example 1 were carried out except that 6.0 g of a mixture containing $CF_3$—$(OCF_2CF_2)_m$—$(OCF_2)_n$—COOH (m≈20, n≈35), HOC-OCF$_2$—$(OCF_2CF_2)_m$—$(OCF_2)_n$—COOH (m≈20, n≈35), and $CF_3$—$(OCF_2CF_2)_m$—$(OCF_2)_n$—$OCF_3$ (m≈20, n≈35) was used (provided that the content of HOCOCF$_2$—$(OCF_2CF_2)_m$—$(OCF_2)_n$—COOH was 34 mol %, and $CF_3$—$(OCF_2CF_2)_m$—$(OCF_2)_n$—$OCF_3$ was 21 mol %), and thus 5.9 g of a mixture containing a polyether group-containing compound (E), a polyether group-containing compound (E'), and a polyether group-containing compound (E") was obtained.

Polyether group-containing compound (E)

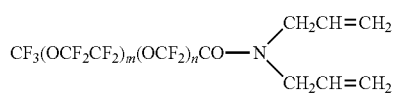

(m ≈ 20, n ≈ 35)

Polyether group-containing compound (E')

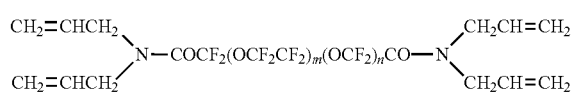

(m ≈ 20, n ≈ 35)

Polyether group-containing compound (E")

(m ≈ 20, n ≈ 35)

Synthetic Example 6

The same operations as in Synthetic Example 2 were carried out except that 5.9 g of the mixture obtained in Synthetic Example 5 was used, and thus 5.8 g of a mixture containing a polyether group-containing compound (F), a polyether group-containing compound (F'), and a polyether group-containing compound (F") was obtained (the e/f ratio was 0.57).

Polyether group-containing compound (F)

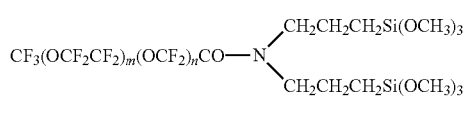

(m ≈ 20, n ≈ 35)

Polyether group-containing compound (F')

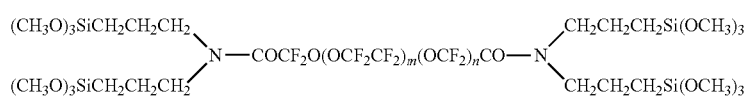

(m ≈ 20, n ≈ 35)

Polyether group-containing compound (F")

(m ≈ 20, n ≈ 35)

Synthetic Example 7

The same operations as in Synthetic Example 1 were carried out except that 6.0 g of a mixture containing $CF_3$—$(OCF_2CF_2)_m$—$(OCF_2)_n$—COOH (m≈20, n≈35), HOC—$OCF_2$—$(OCF_2CF_2)_m$—$(OCF_2)_n$—COOH (m≈20, n≈35), and $CF_3$—$(OCF_2CF_2)_m$—$(OCF_2)_n$—$OCF_3$ (m≈20, n≈35) was used (provided that the content of $HOCOCF_2$—$(OCF_2CF_2)_m$—$(OCF_2)_n$—COOH was 48 mol %, and the content of $CF_3$—$(OCF_2CF_2)_m$—$(OCF_2)_n$—$OCF_3$ was 17 mol %), and thus 6.0 g of a mixture containing a polyether group-containing compound (G), a polyether group-containing compound (G'), and a polyether group-containing compound (G") was obtained.

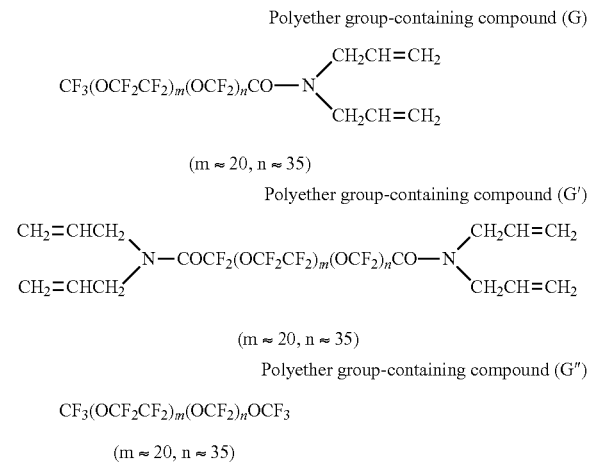

Synthetic Example 8

The same operations as in Synthetic Example 2 were carried out except that 6.0 g of the mixture obtained in Synthetic Example 7 was used, and thus 5.9 g of a mixture containing a polyether group-containing compound (H), a polyether group-containing compound (H'), and a polyether group-containing compound (H") was obtained (the e/f ratio was 0.57).

Example 1

The mixture containing the polyether group-containing compound (B) and the polyether group-containing compound (B') obtained in Synthetic Example 2 was dissolved in hydrofluoroether (Novec HFE-7300, manufactured by 3M) so as to have a concentration of 0.1 mass %, and thus a surface-treating agent (1) was prepared.

Example 2

The mixture containing the polyether group-containing compound (D) and the polyether group-containing compound (D') obtained in Synthetic Example 4 was dissolved in hydrofluoroether (Novec HFE-7300, manufactured by 3M) so as to have a concentration of 0.1 mass %, and thus a surface-treating agent (2) was prepared.

Example 3

The mixture containing the polyether group-containing compound (F), the polyether group-containing compound (F'), and the polyether group-containing compound (F") obtained in Synthetic Example 6 was dissolved in hydrofluoroether (Novec HFE-7200, manufactured by 3M) so as to have a concentration of 0.1 mass %, and thus a surface-treating agent (3) was prepared.

Example 4

The mixture containing the polyether group-containing compound (H), the polyether group-containing compound (H'), and the polyether group-containing compound (H") obtained in Synthetic Example 8 was dissolved in hydrofluoroether (Novec HFE-7200, manufactured by 3M) so as to have a concentration of 0.1 mass %, and thus a surface-treating agent (4) was prepared.

Comparative Examples 1 and 2

Comparative surface-treating agents (1) and (2) were prepared in the same manner as in Example 2 except that the following control compounds (1) and (2) were used, respectively, in place of the mixture containing the polyether group-containing compound (D) and the polyether group-containing compound (D').

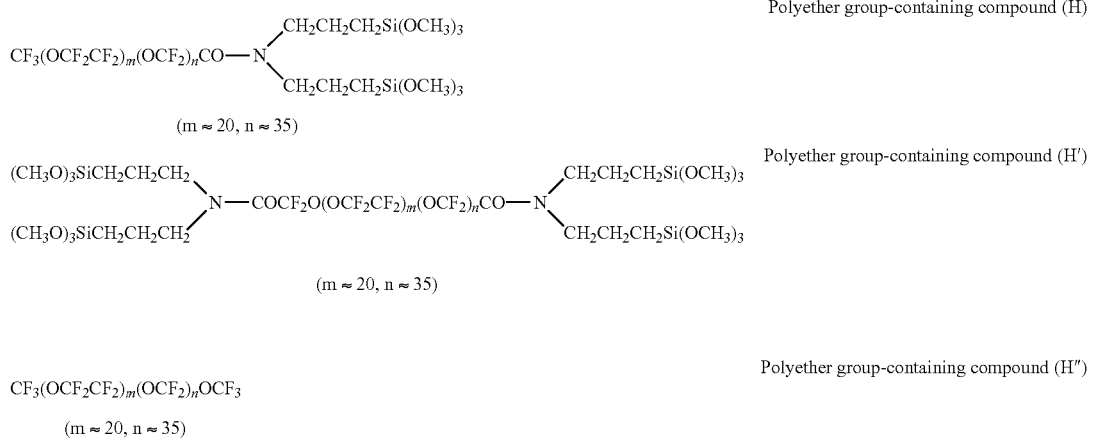

Control Compound (1)

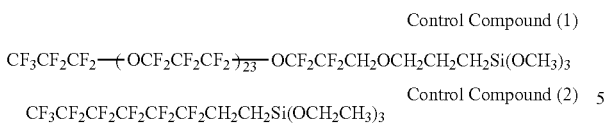

Control Compound (2)

CF$_3$CF$_2$CF$_2$CF$_2$CF$_2$CF$_2$CH$_2$CH$_2$Si(OCH$_2$CH$_3$)$_3$ (Static Contact Angle)

The static contact angle was measured by the following method using a fully automatic contact angle meter Drop-Master 700 (manufactured by Kyowa Interface Science Co., Ltd.).

<Method for Measuring Static Contact Angle>

The static contact angle was obtained by dripping 2 μL of water from a microsyringe onto a horizontally placed substrate and taking a still image with a video microscope 1 second after the dripping.

(Formation of Cured Film)

The surface-treating agents (1) to (4) and the comparative surface-treating agents (1) to (2) were used to form cured films as follows.

A surface-treating agent or a comparative surface-treating agent was applied to a chemically tempered glass ("Gorilla" glass, manufactured by Corning Incorporated, thickness 0.7 mm) using a spin coater.

The spin coating conditions were 300 rpm for 3 seconds and 2000 rpm for 30 seconds.

The coated glass was heated at 150° C. for 30 minutes in a thermostatic oven in air to form a cured film.

[Evaluation of Cured Film Properties]

Properties of the resulting cured film were evaluated as follows.

<Static Contact Angle>

(Initial Evaluation)

First, as an initial evaluation, the cured film was formed, and then the static water contact angle of the surface with which nothing had been brought into contact yet was measured.

(Evaluation after Wiping with Ethanol)

The cured film was wiped back and forth five times with Kimwipe (trade name, manufactured by Jujo Kimberly Co., Ltd.) sufficiently soaked with ethanol, and dried. The static water contact angle of the cured film after being dried was measured.

<Fingerprint Adherability and Removability by Wiping>

(Fingerprint Adherability)

A finger was pressed against a cured film formed using a surface-treating agent or a comparative surface-treating agent, and how easily a fingerprint adheres was visually judged. Evaluations were made according to the following criteria:

A: Fingerprint unlikely adhered, or not noticeable even when adhered.

B: Adhered fingerprint was little, but fingerprint sufficiently confirmed.

C: Fingerprint adhered as clearly as fingerprint on untreated glass substrate.

(Fingerprint Removability by Wiping)

After the fingerprint adherability test, the adhered fingerprint was wiped back and forth five times with Kimwipe (trade name, manufactured by Jujo Kimberly Co., Ltd.), and how easily the adhered fingerprint was wiped off was visually judged. Evaluations were made according to the following criteria:

A: Fingerprint completely wiped off.

B: Fingerprint wiping marks remained.

C: Fingerprint wiping marks spread, and difficult to remove.

The results of the series of evaluations are summarized in Table 1 below.

TABLE 1

| | | Contact angle (degree) | | Fingerprint adherability and removability by wiping | |
|---|---|---|---|---|---|
| Treating agent | | Initial evaluation | After wiping with ethanol | Finger-print adhera-bility | Finger-print remova-bility by wiping |
| Surface-treating agent (1) | Example 1 | 111 | 111 | A | A |
| Surface-treating agent (2) | Example 2 | 113 | 113 | A | A |
| Surface-treating agent (3) | Example 3 | 113 | 113 | A | A |
| Surface-treating agent (4) | Example 4 | 112 | 112 | A | A |
| Comparative surface-treating agent (1) | Comparative Example 1 | 113 | 112 | A | B |
| Comparative surface-treating agent (2) | Comparative Example 2 | 105 | 103 | B | C |

The contact angles of the cured films formed using the surface-treating agents (1) to (4) did not decrease even when the films were wiped using ethanol. On the other hand, the contact angles of the cured films formed using the comparative surface-treating agents (1) and (2) decreased when the films were wiped using ethanol. This is considered to be because the cured films formed of the comparative surface-treating agents (1) and (2) have poor chemical resistance (durability against solvent).

[Evaluation of Frictional Resistance of Cured Films]

The frictional resistance of the resulting cured films was evaluated as follows.

<Eraser Frictional Resistance Test>

Using a rubbing tester (manufactured by Shinto Scientific Co., Ltd.), the water-resisting contact angle was measured every 2,500 times of rubbing under the following conditions, and the test was continued until reaching 10,000 times or a contact angle of less than 100 degrees. The test environment conditions were 25° C. and a humidity of 40% RH.

Eraser: Raber Eraser (manufactured by Minoan)

Ground contact area: 6 mmφ

Travel distance (one way): 30 mm

Travel speed: 3,600 mm/min

Load: 1 kg/6 mmφ

The results of the above evaluation are summarized in Table 2 below. In the table, "-" means that no measurement was performed.

TABLE 2

| Treating agent | | Number of times eraser was rubbed | | | | |
|---|---|---|---|---|---|---|
| | | 0 times | 2,500 times | 5,000 times | 7,500 times | 10,000 times |
| Surface-treating agent (1) | Example 1 | 111 | 108 | 109 | 106 | 102 |
| Surface-treating agent (2) | Example 2 | 113 | 114 | 112 | 113 | 110 |
| Surface-treating agent (3) | Example 3 | 113 | 114 | 111 | 106 | 104 |
| Surface-treating agent (4) | Example 4 | 113 | 113 | 110 | 105 | 101 |
| Comparative surface-treating agent (1) | Comparative Example 1 | 113 | 89 | — | — | — |

[1]. A fluoropolyether group-containing compound represented by formula (1) or (2) below:

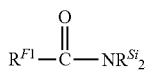

(1)

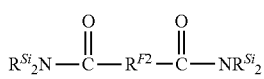

(2)

wherein
$R^{F1}$ is $R^{f1}$—$R^F$—$O_q$—;
$R^{F2}$ is —$R^{f2}_p$—$R^F$—$O_q$—;
$R^{f1}$ is a $C_{1-16}$ alkyl group optionally substituted with one or more fluorine atoms;
$R^{f2}$ is a $C_{1-6}$ alkylene group optionally substituted with one or more fluorine atoms;
$R^F$ is each independently at each occurrence a group represented by formula:

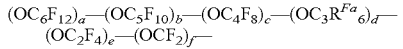

a, b, c, and d are each independently an integer of 0 or more and 30 or less, e and f are each independently an integer of 1 or more and 200 or less, the sum of a, b, c, d, e, and f is at least 5, the occurrence order of each repeating unit enclosed in parentheses provided with a subscript a, b, c, d, e, or f is not limited in the formula, and the ratio of e to f is less than 0.9;
$R^{Fa}$ is each independently at each occurrence a hydrogen atom, a fluorine atom, or a chlorine atom;
p is 0 or 1;
q is independently 0 or 1;
$R^{Si}$ is each independently at each occurrence represented by formula (S1) below:

(S1)

$X^1$ is each independently at each occurrence a single bond, an oxygen atom, or a divalent organic group;
$R^{a1}$ is each independently at each occurrence —$Z^{1'}$—$SiR^{a1'}_{p1'}R^{b1'}_{q1'}R^{c1'}_{r1'}$;
$Z^{1'}$ is each independently at each occurrence a single bond, an oxygen atom, or a divalent organic group;
$R^{a1'}$ is each independently at each occurrence —$Z^{1''}$—$SiR^{a1''}_{p1''}R^{b1''}_{q1''}R^{c1''}_{r1''}$;
$Z^{1''}$ is each independently at each occurrence a single bond, an oxygen atom, or a divalent organic group;
$R^{a1''}$ is each independently at each occurrence —$Z^{1'''}$—$SiR^{a1'''}_{p1'''}R^{b1'''}_{q1'''}R^{c1'''}_{r1'''}$;
$Z^{1'''}$ is each independently at each occurrence a single bond, an oxygen atom, or a divalent organic group;
$R^{b1'''}$ is each independently at each occurrence a hydroxyl group or a hydrolyzable group;
$R^{c1'''}$ is each independently at each occurrence a hydrogen atom or a monovalent organic group;
q1''' is each independently at each occurrence an integer of 0 to 3;
r1''' is each independently at each occurrence an integer of 0 to 3;
$R^{b1''}$ is each independently at each occurrence a hydroxyl group or a hydrolyzable group;
$R^{c1''}$ is each independently at each occurrence a hydrogen atom or a monovalent organic group;
p1'' is each independently at each occurrence an integer of 0 to 3;
q1'' is each independently at each occurrence an integer of 0 to 3;
r1'' is each independently at each occurrence an integer of 0 to 3;
$R^{b1'}$ is each independently at each occurrence a hydroxyl group or a hydrolyzable group;
$R^{c1'}$ is each independently at each occurrence a hydrogen atom or a monovalent organic group;
p1' is each independently at each occurrence an integer of 0 to 3;
q1' is each independently at each occurrence an integer of 0 to 3;
r1' is each independently at each occurrence an integer of 0 to 3;
$R^{b1}$ is each independently at each occurrence a hydroxyl group or a hydrolyzable group;
$R^{c1}$ is each independently at each occurrence a hydrogen atom or a monovalent organic group;
p1 is each independently at each occurrence an integer of 0 to 3;
q1 is each independently at each occurrence an integer of 0 to 3; and
r1 is each independently at each occurrence an integer of 0 to 3;
provided that at least one $R^{b1}$, $R^{b1'}$, $R^{b1''}$, or $R^{b1'''}$ is present for each group represented by $R^{Si}$.

[2]. The fluoropolyether group-containing compound according to [1], wherein $R^F$ is represented by:

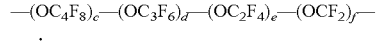

wherein
c and d are each independently an integer of 0 or more and 30 or less, e and f are each independently an integer of 1 or more and 200 or less, and the occurrence order of each repeating unit enclosed in parentheses provided with a subscript c, d, e, or f is not limited in the formula.

[3]. The fluoropolyether group-containing compound according to [1] or [2], wherein the ratio of e to f is in a range of 0.4 or more and less than 0.9.

[4]. The fluoropolyether group-containing compound according to any one of [1] to [3], wherein $X^1$ is each independently at each occurrence a divalent organic group.

[5]. The fluoropolyether group-containing compound according to any one of [1] to [4], wherein $X^1$ is each independently at each occurrence:

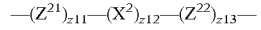

wherein $Z^{21}$ and $Z^{22}$ are a divalent organic group;
$X^2$ is an oxygen atom;
z11 is 0 or 1;
z12 is 0 or 1; and
z13 is 0 or 1;
provided that at least one of z11 and z13 is 1.

[6]. The fluoropolyether group-containing compound according to any one of [1] to [5], wherein $R^{Fa}$ is a fluorine atom.

[7]. The fluoropolyether group-containing compound according to any one of [1] to [6], wherein p1 is 0, and q1 is 2 or 3.

[8]. A surface-treating agent comprising the fluoropolyether group-containing compound according to any one of [1] to [7].

[9]. The surface-treating agent according to [8], wherein the fluoropolyether group-containing compounds are the compound represented by formula (1) and the compound represented by formula (2).

[10]. The surface-treating agent according to [8] or [9], wherein the fluoropolyether group-containing compound represented by formula (2) is contained in a molar ratio of 0.001 to 0.70 to the total of the fluoropolyether group-containing compound represented by formula (1) and the fluoropolyether group-containing compound represented by formula (2).

[11]. The surface-treating agent according to any one of [8] to [10], further comprising one or more other components selected from a fluorine-containing oil, a silicone oil, and a catalyst.

[12]. The surface-treating agent according to any one of [8] to [10], further comprising a fluorine-containing oil.

[13]. The surface-treating agent according to [12], wherein the fluoropolyether group-containing compound represented by formula (2) is contained in an amount of 0.001 to 70 mol %, and the fluorine-containing oil is contained in an amount of 0.001 to 50 mol %, based on the total of the fluoropolyether group-containing compound represented by formula (1), the fluoropolyether group-containing compound represented by formula (2) and the fluorine-containing oil.

[14]. The surface-treating agent according to any one of [8] to [13], further comprising a solvent.

[15]. The surface-treating agent according to any one of [8] to [14], which is used as an antifouling coating agent or a water-proof coating agent.

[16]. The surface-treating agent according to any one of [8] to [15], which is for vacuum deposition.

[17]. A pellet comprising the surface-treating agent according to any one of [8] to [16].

[18]. An article comprising a substrate and a layer on a surface of the substrate, wherein the layer is formed of the compound according to any one of [1] to [7] or the surface-treating agent according to any one of [8] to [16].

[19]. The article according to [18], which is an optical member.

INDUSTRIAL APPLICABILITY

The fluoropolyether group-containing compound of the present disclosure can be suitably used to form a surface-treating layer on the surfaces of a wide variety of substrates or, in particular, optical members that require friction durability.

What is claimed is:
1. A surface-treating agent comprising a fluoropolyether group-containing compound represented by formula (1) and a fluoropolyether group-containing compound represented by formula (2) below:

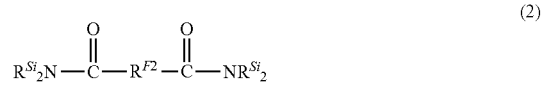

wherein
$R^{F1}$ is $R^{f1}$—$R^F$—$O_q$—;
$R^{F2}$ is —$R^{f2}_p$—$R^F$—$O_q$—;
$R^{f1}$ is a $C_{1-16}$ alkyl group optionally substituted with one or more fluorine atoms;
$R^{f2}$ is a $C_{1-6}$ alkylene group optionally substituted with one or more fluorine atoms;
$R^F$ is each independently at each occurrence a group represented by formula:

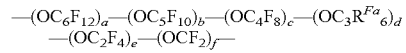

a, b, c, and d are each independently an integer of 0 or more and 30 or less, e and f are each independently an integer of 1 or more and 200 or less, the sum of a, b, c, d, e, and f is at least 5, the occurrence order of each repeating unit enclosed in parentheses provided with a subscript a, b, c, d, e, or f is not limited in the formula, and the ratio of e to f is less than 0.9;
$R^{Fa}$ is each independently at each occurrence a hydrogen atom, a fluorine atom, or a chlorine atom;
p is 0 or 1;
q is independently 0 or 1;
$R^{Si}$ is each independently at each occurrence represented by formula (S1) below:

$X^1$ is each independently at each occurrence a single bond, an oxygen atom, or a divalent organic group;
$R^{a1}$ is each independently at each occurrence —$Z^{1'}$—$SiR^{a1'}_{p1'}R^{b1'}_{q1'}R^{d1'}_{r1'}$;
$Z^{1'}$ is each independently at each occurrence a single bond, an oxygen atom, or a divalent organic group;
$R^{a1'}$ is each independently at each occurrence —$Z^{1''}$—$SiR^{a1''}_{p1''}R^{b1''}_{q1''}R^{c1''}_{r1''}$;
$Z^{1''}$ is each independently at each occurrence a single bond, an oxygen atom, or a divalent organic group;
$R^{a1''}$ is each independently at each occurrence —$Z^{1'''}$—$SiR^{b1'''}_{q1'''}R^{c1'''}_{r1'''}$;
$Z^{1'''}$ is each independently at each occurrence a single bond, an oxygen atom, or a divalent organic group;
$R^{b41'''}$ is each independently at each occurrence a hydroxyl group or a hydrolyzable group;
$R^{c1'''}$ is each independently at each occurrence a hydrogen atom or a monovalent organic group;
q1''' is each independently at each occurrence an integer of 0 to 3;
r1''' is each independently at each occurrence an integer of 0 to 3;
$R^{b1''}$ is each independently at each occurrence a hydroxyl group or a hydrolyzable group;

$R^{c1'''}$ is each independently at each occurrence a hydrogen atom or a monovalent organic group;

p1'' is each independently at each occurrence an integer of 0 to 3;

q1'' is each independently at each occurrence an integer of 0 to 3;

r1'' is each independently at each occurrence an integer of 0 to 3;

$R^{b1'}$ is each independently at each occurrence a hydroxyl group or a hydrolyzable group;

$R^{c1'}$ is each independently at each occurrence a hydrogen atom or a monovalent organic group;

p1' is each independently at each occurrence an integer of 0 to 3;

q1' is each independently at each occurrence an integer of 0 to 3;

r1' is each independently at each occurrence an integer of 0 to 3;

$R^{b1}$ is each independently at each occurrence a hydroxyl group or a hydrolyzable group;

$R^{c1}$ is each independently at each occurrence a hydrogen atom or a monovalent organic group;

p1 is each independently at each occurrence an integer of 0 to 3;

q1 is each independently at each occurrence an integer of 0 to 3; and r1 is each independently at each occurrence an integer of 0 to 3;

provided that at least one $R^{b1}$, $R^{b1'}$, $R^{b1''}$, or $R^{b1'''}$ is present for each group represented by $R^{Si}$.

2. The surface treating agent according to claim 1, wherein $R^F$ is represented by:

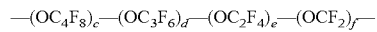

wherein c and d are each independently an integer of 0 or more and 30 or less, e and f are each independently an integer of 1 or more and 200 or less, and the occurrence order of each repeating unit enclosed in parentheses provided with a subscript c, d, e, or f is not limited in the formula.

3. The surface treating agent according to claim 1, wherein the ratio of e to f is in a range of 0.4 or more and less than 0.9.

4. The surface treating agent according to claim 1, wherein $X^1$ is each independently at each occurrence a divalent organic group.

5. The surface treating agent according to claim 1, wherein $x^1$ is each independently at each occurrence:

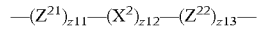

wherein $Z^{21}$ and $Z^{22}$ are a divalent organic group;

$X^2$ is an oxygen atom;

z11 is 0 or 1;

z12 is 0 or 1; and z13 is 0 or 1, provided that at least one of z11 and z13 is 1.

6. The surface treating agent according to claim 1, wherein $R^{Fa}$ is a fluorine atom.

7. The surface treating agent according to claim 1, wherein p1 is 0, and q1 is 2 or 3.

* * * * *